US008802313B2

(12) United States Patent
Ogawa et al.

(10) Patent No.: US 8,802,313 B2
(45) Date of Patent: *Aug. 12, 2014

(54) FUEL CELL

(75) Inventors: Tetsuya Ogawa, Wako (JP); Koji Dan, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 998 days.

This patent is subject to a terminal disclaimer.

(21) Appl. No.: 12/443,813

(22) PCT Filed: Oct. 1, 2007

(86) PCT No.: PCT/JP2007/069532
§ 371 (c)(1),
(2), (4) Date: Mar. 31, 2009

(87) PCT Pub. No.: WO2008/050598
PCT Pub. Date: May 2, 2008

(65) Prior Publication Data
US 2010/0099003 A1   Apr. 22, 2010

(30) Foreign Application Priority Data

Oct. 19, 2006 (JP) ................................ 2006-285218
Oct. 19, 2006 (JP) ................................ 2006-285221

(51) Int. Cl.
*H01M 8/24* (2006.01)
*H01M 8/04* (2006.01)
*H01M 8/10* (2006.01)

(52) U.S. Cl.
USPC ........... 429/457; 429/456; 429/454; 429/513; 429/514; 429/483

(58) Field of Classification Search
CPC .................................................... H01M 8/249
USPC ................. 429/457, 456, 454, 514, 513, 483
See application file for complete search history.

(56) References Cited

U.S. PATENT DOCUMENTS

| 2001/0019790 A1 | 9/2001 | Regan et al. |
| 2003/0049514 A1 | 3/2003 | Mallant |
| 2005/0136319 A1 | 6/2005 | Tsunoda et al. |

FOREIGN PATENT DOCUMENTS

| JP | 11-339828 | 12/1999 |
| JP | 2000-164234 | 6/2000 |

(Continued)

OTHER PUBLICATIONS

Webster's New World Dictionary of the American Language, 1951, The World Publishing Company, College Edition, P759.*

(Continued)

*Primary Examiner* — Helen O Conley
(74) *Attorney, Agent, or Firm* — Nelson Mullins Riley & Scarborough LLP; Anthony A. Laurentano

(57) ABSTRACT

A separator includes a first plate and a second plate. The separator has a first fuel gas supply unit, a second fuel gas supply unit, first sandwiching sections, second sandwiching sections, a first case unit and a second case unit. A fuel gas supply passage extends through the first fuel gas supply unit and the second fuel gas supply unit in a stacking direction. The first sandwiching sections are connected to the first fuel gas supply unit through first bridges, and the second sandwiching sections are connected to a second fuel gas supply unit through first bridges. The first sandwiching sections and the second sandwiching sections sandwich electrolyte electrode assemblies. Each of the first sandwiching sections and the second sandwiching sections sandwich electrolyte electrode assemblies. Each of the first sandwiching sections has a fuel gas inlet and each of the second sandwiching sections has an oxygen-containing gas inlet. The first case unit and the second case unit have oxygen-containing gas supply units. The first case unit is connected to the first sandwiching sections through second bridges, and the second case unit is connected to the second sandwiching sections through second bridges. Oxygen-containing gas supply passages extend through the oxygen-containing gas supply units in the stacking direction.

26 Claims, 22 Drawing Sheets

(56) References Cited

FOREIGN PATENT DOCUMENTS

| JP | 2001-126747 | 5/2001 |
| JP | 2006-120589 | 5/2006 |
| WO | WO-2004/102710 A1 | 11/2004 |
| WO | WO-2005/086273 A1 | 9/2005 |

OTHER PUBLICATIONS

International Search Report for Application No. PCT/JP2007/069532, dated Mar. 6, 2008.

* cited by examiner

FUEL CELL

RELATED APPLICATIONS

This application is a 35 U.S.C. 371 national stage filing of International Application No. PCT/JP2007/069532, filed on Oct. 1, 2007, which claims priority to Japanese Patent Application No. 2006-285218 filed on Oct. 19, 2006 and Japanese Patent Application No. 2006-285221 filed on Oct. 19, 2006 in Japan. The contents of the aforementioned applications are hereby incorporated by reference.

TECHNICAL FIELD

The present invention relates to a fuel cell formed by stacking electrolyte electrode assemblies between separators. Each of the electrolyte electrode assemblies includes an anode, a cathode, and an electrolyte interposed between the anode and the cathode. Further, the present invention relates to a fuel cell stack formed by stacking a plurality of the fuel cells.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, predetermined numbers of the electrolyte electrode assemblies and the separators are stacked together to form a fuel cell stack.

In the fuel cell, a fuel gas channel for supplying a fuel gas such as a hydrogen-gas to the anode and an oxygen-containing gas channel for supplying an oxygen-containing gas such as the air to the cathode are formed along surfaces of the separators.

For example, in a flat stack fuel cell disclosed in Japanese Laid-Open Patent Publication No. 2006-120589, as shown in FIG. 21, a separator 1 stacked on a power generation cell (not shown) is provided. The separator 1 is formed by connecting left and right manifold parts 2a, 2a and a part 2b at the center where the power generation cell is provided, by joint parts 2c, 2c. The joint parts 2c have elasticity.

The manifold parts 2a, 2a have gas holes 3, 4. One gas hole 3 is connected to a fuel gas channel 3a, and the other gas hole 4 is connected to an oxygen-containing gas channel 4a. The fuel gas channel 3a and the oxygen-containing gas channel 4a partially extend in a spiral pattern in the part 2b, and are opened to a fuel electrode current collector and an air electrode current collector, which are not shown, respectively, at positions near the center of the part 2b.

The separator 1 and the power generation cell are stacked together to form stack structure. Normally, the stack is provided in a casing formed as a separate body. Therefore, the number of components is relatively large. Assembling performance is low, and the production cost is high. Since the stack is covered with the casing as the separate body, it is difficult to maintain the temperature of the stack desirably, and for example, dedicated heat insulating structure needs to be adopted. Thus, the cost for such structure is high, and the overall size of the equipment becomes large.

In the fuel cell stack, it is necessary to detect whether the fuel cells have the desired power generation performance. It is because, if the power generation performance of any of the fuel cells is lowered, the control based on the voltage of the fuel cell having the poor performance (lowest fuel cell voltage) needs to be implemented. For this purpose, normally, a cell voltage terminal provided in the separator is connected to a voltage detection apparatus (cell voltage monitor), and operation of detecting the cell voltage for each fuel cell during power generation is performed.

For example, in a fuel cell stack disclosed in Japanese Laid-Open Patent Publication No. 11-339828, as shown in FIG. 22, a plurality of cells 6 are stacked between end plates 5a, 5b. The cells 6 are joined to L-shaped voltage measurement terminals 7 integrally with the separator (the voltage measurement terminals 7 may be provided as separate bodies which are not integral with the separators). The voltage measurement terminals 7 are connected to a voltmeter (not shown) through a wiring. The components between the end plates 5a, 5b are tightened together in a stacking direction by support plates 8 fixed to four corners.

In practice, the fuel cell stack needs to be placed in a casing considering heat insulation or the like. Therefore, the wiring connected to the voltage measurement terminals 7 needs to pass through the casing to the outside. For this purpose, the casing needs to have a wiring access hole, and the fabrication cost for making the wiring access hole is required. Further, the through hole for the wiring requires seal material and heat insulating material. Therefore, the additional cost for the seal material and the heat insulating material is required.

Further, since the voltage measurement terminals 7 and the wiring are provided between the fuel cell stack and the casing, the voltage measurement terminals 7 and the wiring are exposed to the exhaust gas from the fuel cell stack, and degraded easily. In particular, in the case where the voltage measurement terminals 7 and the wiring are used in SOFC, since the exhaust gas has a considerably high temperature, the voltage measurement terminals 7 may be deformed by the heat of the exhaust gas undesirably. Thus, the deformed voltage measurement terminals 7 contact the voltage measurement terminals 7 of the adjacent separator, and short circuiting may occur between the separators.

DISCLOSURE OF INVENTION

The present invention has been made to solve the above problems, and an object of the present invention is to provide a fuel cell having compact structure which can be produced at low cost by effectively reducing the number of components to improve the assembling performance.

Another object of the present invention is to provide a fuel cell stack having simple and economical structure in which no wiring through holes are required, and it is possible to measure the voltage suitably.

The present invention relates to a fuel cell formed by stacking electrolyte electrode assemblies between separators. Each of the electrolyte electrode assemblies includes an anode, a cathode, and an electrolyte interposed between the anode and the cathode.

Each of the separators comprises sandwiching sections, bridges, and a reactant gas supply unit. The sandwiching sections sandwich the electrolyte electrode assemblies. At least a fuel gas inlet for supplying a fuel gas along an electrode surface of the anode or an oxygen-containing gas inlet for supplying an oxygen-containing gas along an electrode surface of the cathode is formed in each of the sandwiching sections. The bridges are connected to the sandwiching sections. Each of the bridges has a reactant gas supply channel for supplying the fuel gas to the fuel gas inlet or supplying the oxygen-containing gas to the oxygen-containing gas inlet. The reactant gas supply unit is connected to the bridges. A reactant gas supply passage extends through the reactant gas supply unit in a stacking direction for supplying the fuel gas or the oxygen-containing gas to the reactant gas supply channel. A case unit containing the electrolyte electrode assemblies is provided integrally with the separator.

Further, the present invention relates to a fuel cell stack formed by stacking a plurality of fuel cells. Each of the fuel cells is formed by stacking electrolyte electrode assemblies between separators. Each of the electrolyte electrode assemblies includes an anode, a cathode, and an electrolyte interposed between the anode and the cathode.

Each of the separators comprises sandwiching sections, bridges, and a reactant gas supply unit. The sandwiching sections sandwich the electrolyte electrode assemblies. At least a reactant gas inlet for supplying a reactant gas that is a fuel gas or an oxygen-containing gas along an electrode surface of the anode or the cathode is formed in each of the sandwiching sections. The bridges are connected to the sandwiching sections. Each of the bridges has a reactant gas supply channel for supplying the reactant gas to the reactant gas inlet. The reactant gas supply unit is connected to the bridges. A reactant gas supply passage extends through the reactant gas supply unit in a stacking direction for supplying the reactant gas to the reactant gas supply channel. A case unit forming an outer circumferential portion of the separator for containing the electrolyte electrode assemblies is provided. The sandwiching sections, the bridges, the reactant gas supply unit and the case unit are provided integrally with the separator.

At least one extension for collecting the voltage obtained in power generation of the electrolyte electrode assemblies is formed in the outer circumferential portion of the case unit.

Further, according to another aspect of the present invention, each of the separators comprises sandwiching sections, first bridges, a first reactant gas supply unit, second bridges, a case unit, and second reactant gas supply units. The sandwiching sections sandwich the electrolyte electrode assemblies. A fuel gas inlet for supplying a fuel gas along an electrode surface of the anode and an oxygen-containing gas inlet for supplying an oxygen-containing gas along an electrode surface of the cathode are formed in each of the sandwiching sections. The first bridges are connected to the sandwiching sections, and each of the first bridges has a first reactant gas supply channel for supplying the fuel gas to the fuel gas inlet or supplying the oxygen-containing gas to the oxygen-containing gas inlet. The first reactant gas supply unit is connected to the first bridges. A first reactant gas supply passage extends through the first reactant gas supply unit in a stacking direction for supplying the fuel gas or the oxygen-containing gas to the first reactant gas supply channel. The second bridges are connected to the sandwiching sections. Each of the second bridges has a second reactant gas supply channel for supplying the fuel gas to the fuel gas inlet or supplying the oxygen-containing gas to the oxygen-containing gas inlet. The case unit is connected to the second bridges. The case unit contains the electrolyte electrode assemblies. The second reactant gas supply units are provided in the case unit. Second reactant gas supply passages extend through the second reactant gas supply units in the stacking direction for supplying the oxygen-containing gas or the fuel gas to the second reactant gas channel.

In the present invention, since the case unit is provided integrally with the separator, the overall outer dimensions of the fuel cell depend on the outer shape of the separator. In the structure, no casing as a separate body is required. The number of components is effectively reduced, and improvement in assembling performance is achieved. It is possible to reduce the size of the fuel cell, and produce the fuel cell at low cost.

Further, the case unit functions as a barrier member for preventing diffusion of the exhaust gas discharged from the fuel cell to the outside of the fuel cell, and as a heat insulating member for preventing diffusion of heat energy. In the structure, it is possible to maintain the temperature of the fuel cell, and improve heat efficiency by waste heat collection. Consequently, heat insulating structure is simplified greatly, and economically.

Further, in the presence of the bridge, the load in the stacking direction is not transmitted between the reactant gas supply unit and the sandwiching section. In the simple and compact structure, in the reactant gas supply unit where highly good sealing performance is required, a large surface pressure (load per unit area) is generated in comparison with the sandwiching section. In the electrolyte electrode assembly, a relatively small surface pressure (load per unit area) is generated. Thus, the desired sealing performance in the reactant gas supply unit is achieved, while preventing the damage of the electrolyte electrode assemblies. In the structure, the power generation is performed efficiently.

Further, in the present invention, the case unit integrally with the separator form the outer circumferential portion of the fuel cell stack, and an extension is formed in the outer circumferential portion of the case unit as a terminal for collecting the voltage obtained in the power generation of the electrolyte electrode assemblies. In the structure, no conventional through holes for insertion of wirings are required in the casing containing the fuel cell stack. Thus, operation of forming the through holes, and operation of attaching the seal members or a heat insulating material to the through holes are not required economically.

Further, since the extension and the wirings are provided in the outer circumferential portion of the case unit, the extension and the wirings are not exposed to the heat or the hot exhaust gas due to the power generation reaction. Thus, it is possible to suitably prevent corrosion or the like of the extension and the wiring. Improvement in the durability is achieved easily. It is possible to efficiently measure the generated power voltage. Further, it is possible to easily detect the position where any failure occurs, and measure the power generation condition in each layer of the fuel cell stack. Thus, reliability in the voltage measurement is improved.

BEST MODE FOR CARRYING OUT THE INVENTION

Figure 1:
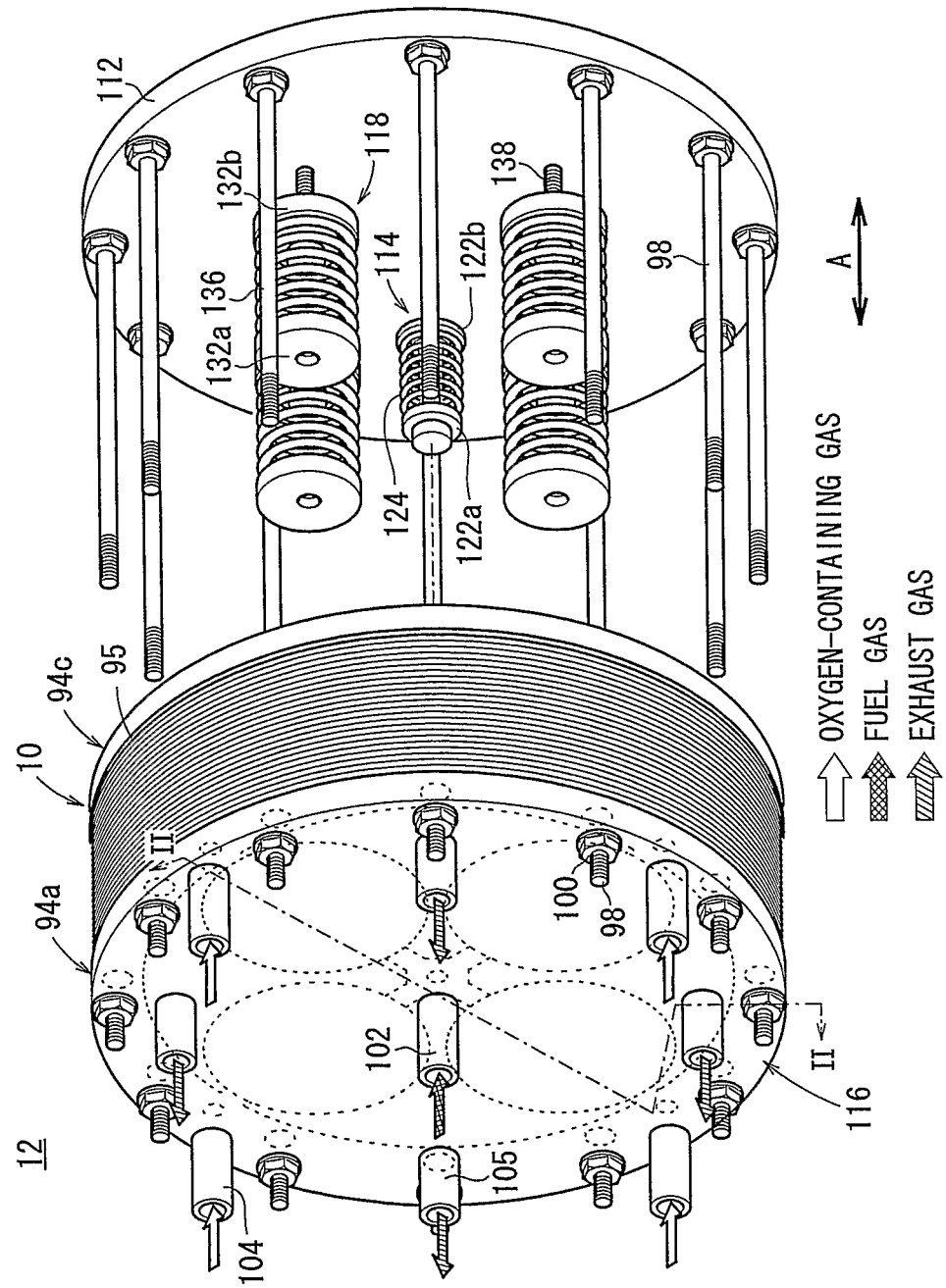
FIG. 1 is a perspective view schematically showing a fuel cell stack formed by stacking fuel cells according to a first embodiment of the present invention.
Figure 2:
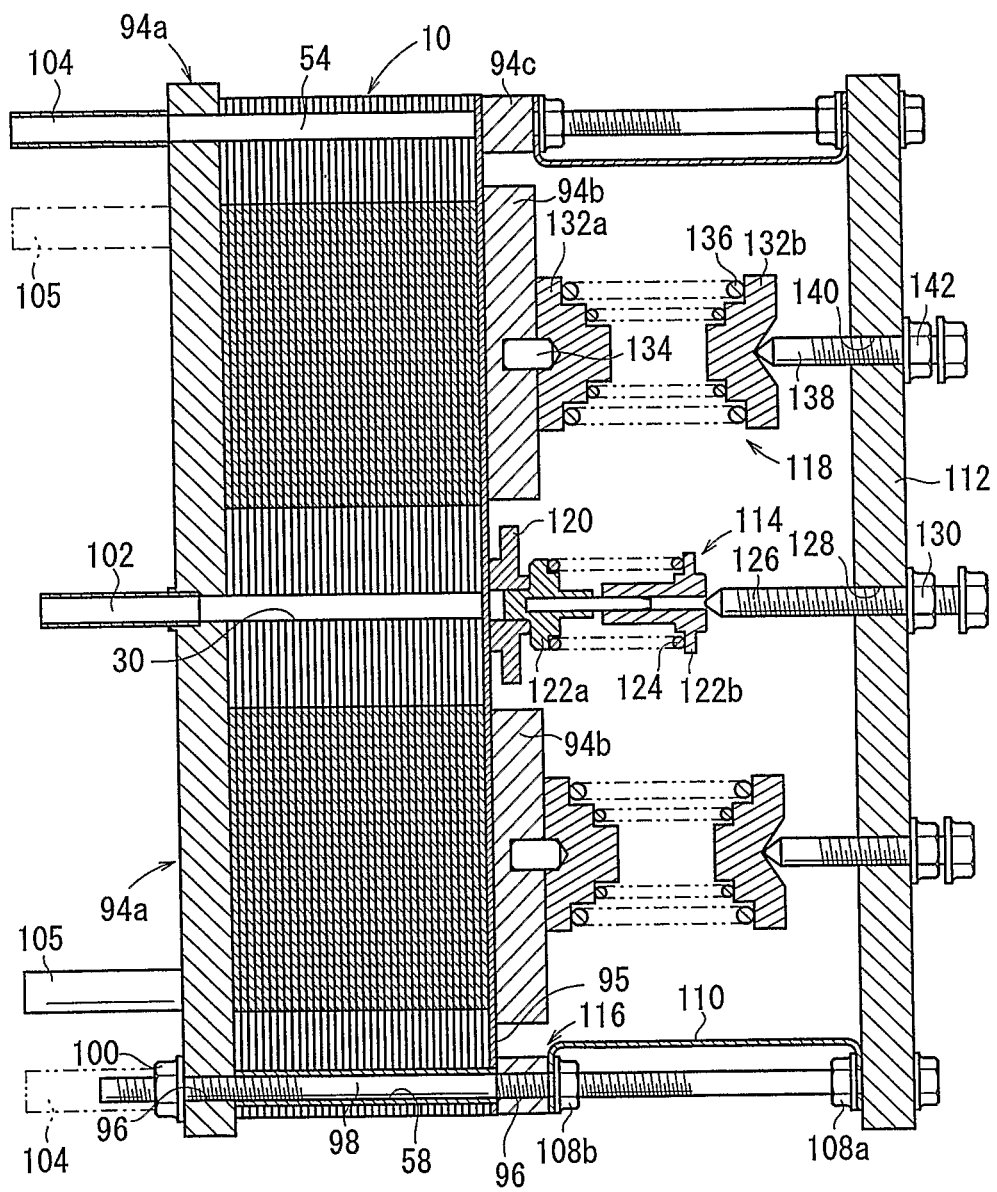
FIG. 2 is a cross sectional view showing the fuel cell stack taken along a line II-II in FIG. 1.

FIG. 1 is a perspective view schematically showing a fuel cell stack 12 formed by stacking fuel cells 10 according to a first embodiment of the present invention in a direction indicated by an arrow A. FIG. 2 is a cross sectional view showing the fuel cell stack 12 taken along a line II-II in FIG. 1.

Figure 3:
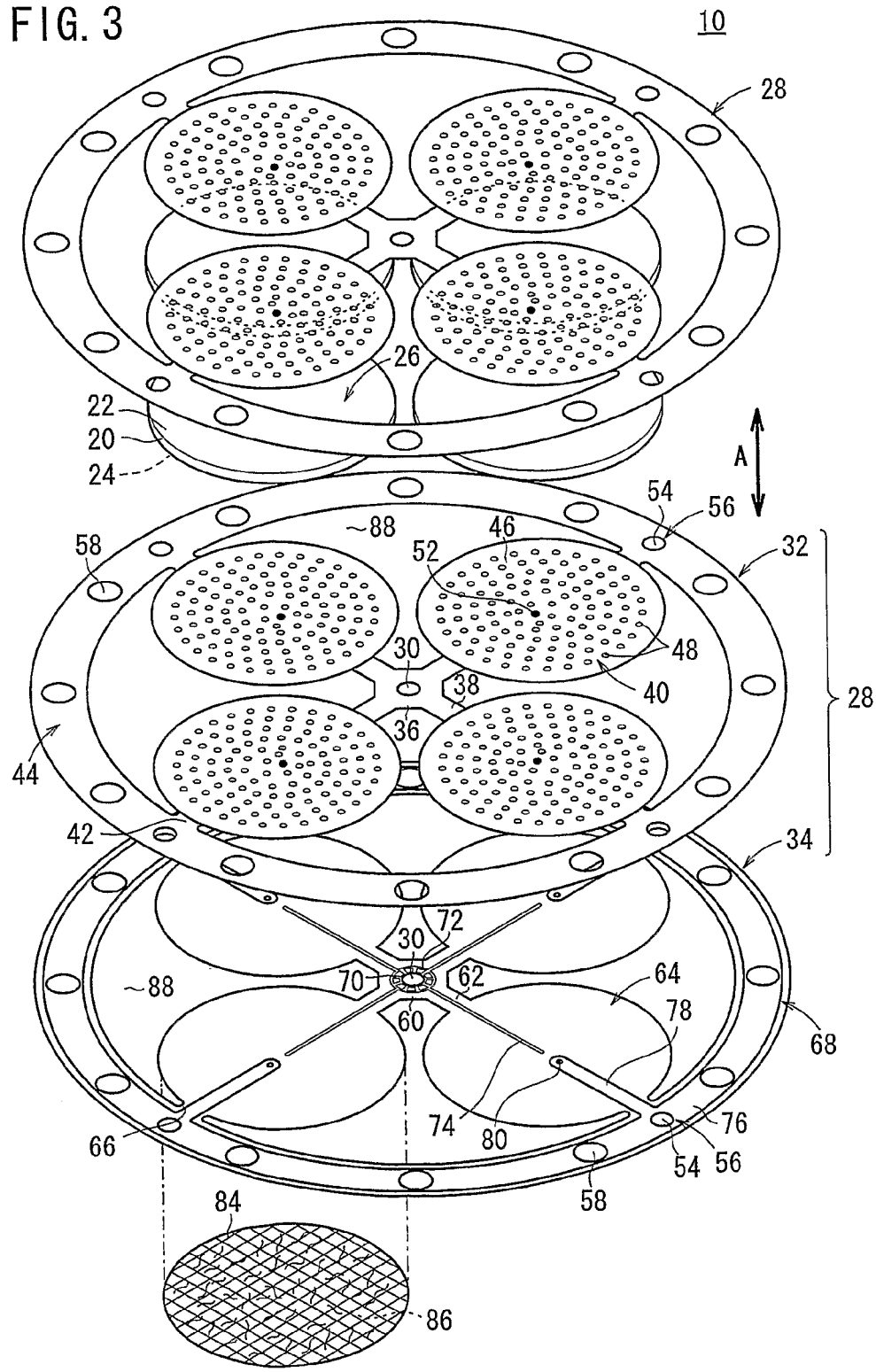
FIG. 3 is an exploded perspective view showing the fuel cell.
Figure 4:
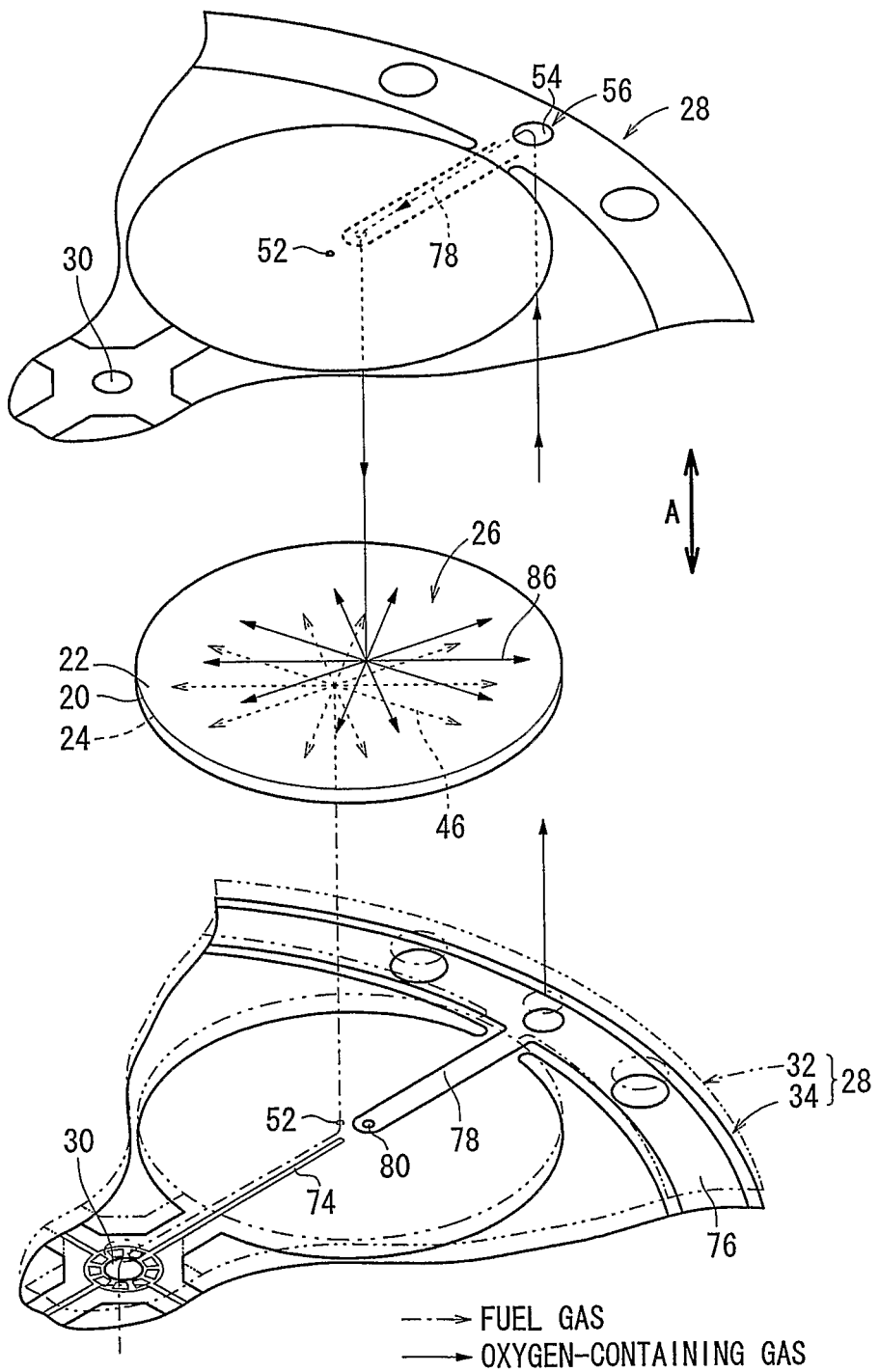
FIG. 4 is a partial exploded perspective view showing gas flows in the fuel cell.

The fuel cell 10 is used in various applications, including stationary and mobile applications. For example, the fuel cell 10 is mounted on a vehicle. The fuel cell 10 is a solid oxide fuel cell (SOFC). As shown in FIGS. 3 and 4, the fuel cell 10 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape.

As shown in FIG. 3, the fuel cell 10 is formed by sandwiching a plurality of, e.g., four electrolyte electrode assemblies 26 between a pair of separators 28. The four electrolyte electrode assemblies 26 are provided around a fuel gas supply passage 30 extending through the center of the separators 28, at predetermined intervals (angles) along a circle concentrically with the fuel gas supply passage 30.

Each of the separators 28 includes first and second plates 32, 34. The first and second plates 32, 34 are metal plates of, e.g., stainless alloy. For example, the first plate 32 and the second plate 34 are joined to each other by diffusion bonding, laser welding, or brazing. Instead of the metal plates, for example, carbon plates may be used as the first plate 32 and the second plate 34 (description regarding the method of bonding the first plate 32 and the second plate 34 is omitted).

Figure 5:
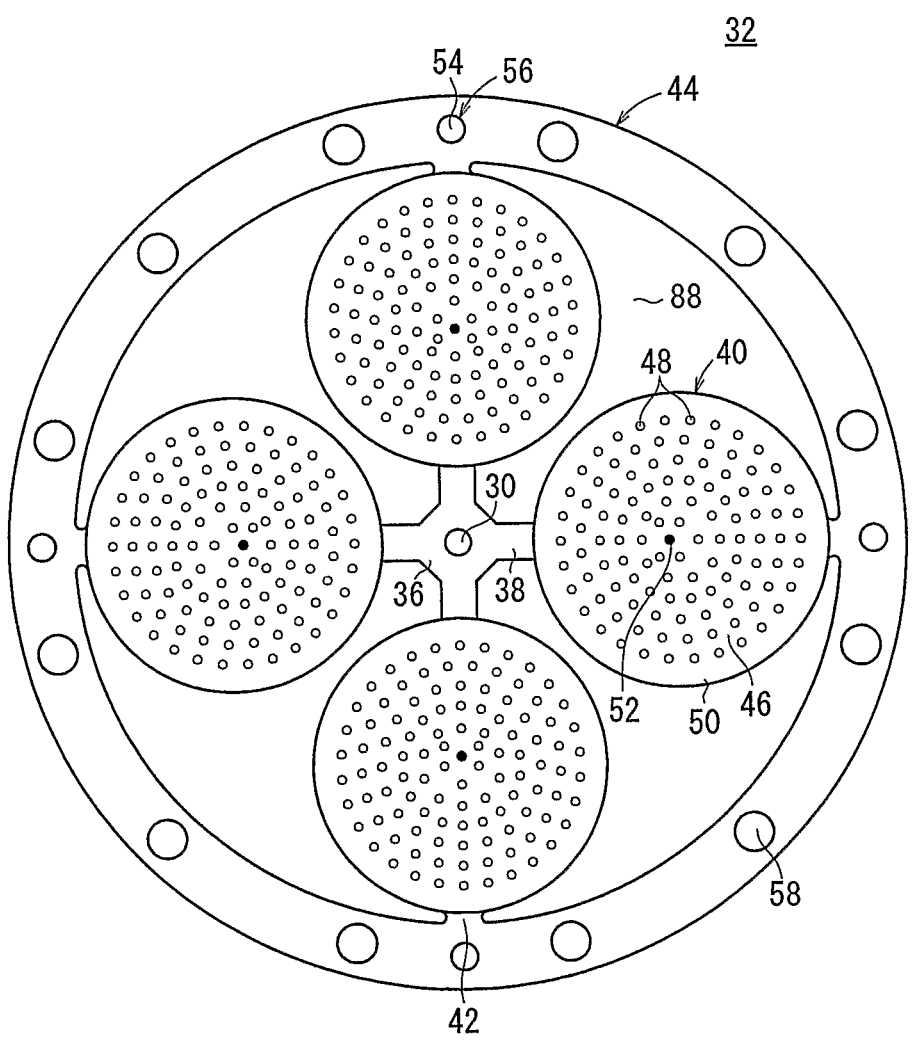
FIG. 5 is a view showing a first plate of the separator.

As shown in FIGS. 3 and 5, a first fuel gas supply unit (reactant gas supply unit) 36 is formed at the center of the first plate 32. The fuel gas supply passage (reactant gas supply passage) 30 extends through the fuel gas supply unit 36, for supplying a fuel gas in the stacking direction indicated by the arrow A. Four first bridges 38 extend radially outwardly from the first fuel gas supply unit 36 at equal intervals. The first fuel gas supply unit 36 is integral with first sandwiching sections 40 each having a relatively large diameter. The first sandwiching section 40 and the electrolyte electrode assembly 26 have the same size. The first sandwiching sections 40 are integral with an annular first case unit 44 through short second bridges (other bridges) 42.

Each of the first sandwiching sections 40 has a plurality of projections 48 on a surface which contacts the anode 24. The projections 48 form a fuel gas channel 46 for supplying a fuel gas along an electrode surface of the anode 24. The projections 48 function as a current collector. A fuel gas inlet 52 for supplying the fuel gas is formed at substantially the center of the first sandwiching section 40, at a position deviated toward the fuel gas supply passage 30 for supplying the fuel gas toward the substantially central region of the anode 24.

The first case unit 44 includes oxygen-containing gas supply units (other reactant gas supply units) 56. The oxygen-containing gas supply passages (other reactant gas supply passages) 54 extend through the oxygen-containing gas supply units 56 in the stacking direction, for supplying an oxygen-containing gas to oxygen-containing gas supply channels 78 as described later. A plurality of bolt insertion holes 58 are formed in the first case unit 44 at predetermined intervals (angles). The fuel gas supply passage 30, the first bridge 38, the first sandwiching section 40, the second bridge 42, and the oxygen-containing gas supply passage 54 extend in a straight line along the separator surface.

Figure 6:
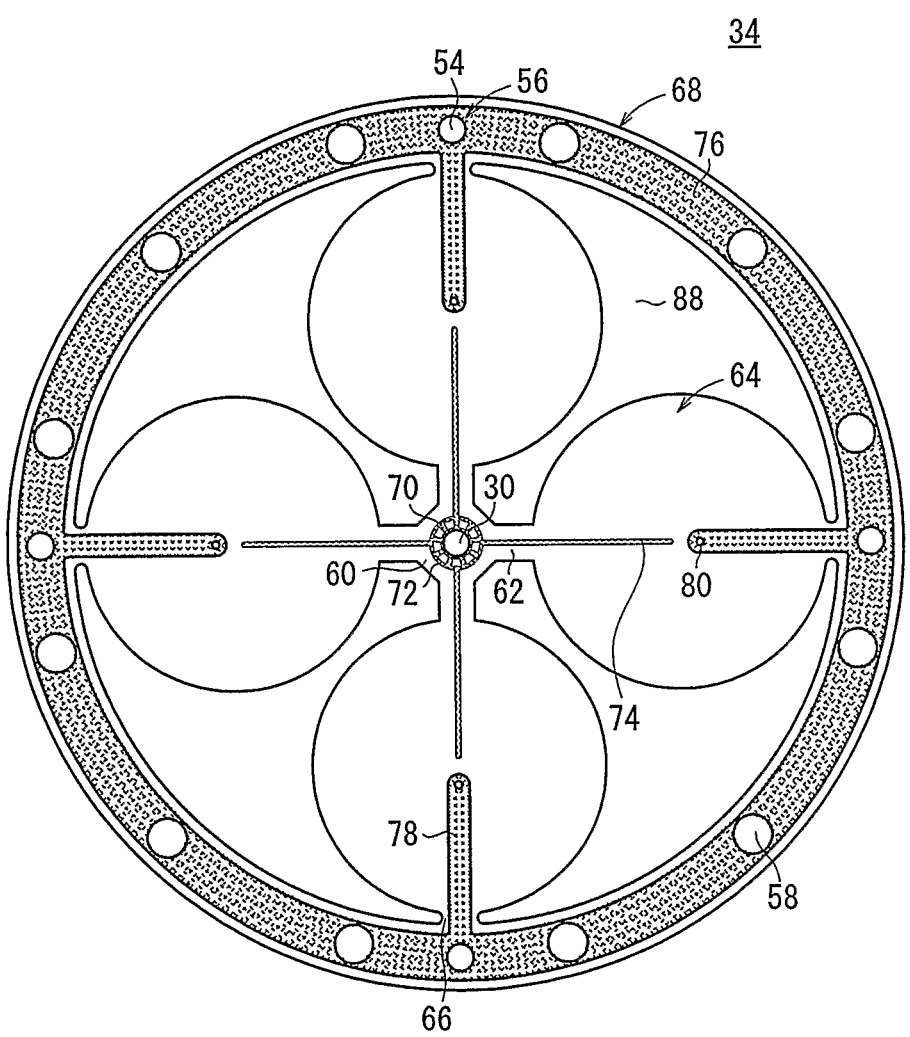
FIG. 6 is a view showing a second plate of a separator.

As shown in FIGS. 3 and 6, a second fuel gas supply unit (reactant gas supply unit) 60 is formed at the center of the second plate 34, and the fuel gas supply passage 30 extends through the center of the second fuel gas supply unit 60. Four first bridges 62 extend radially outwardly from the second fuel gas supply unit (reactant gas supply unit) 60 at predetermined intervals (angles), and the second fuel gas supply unit 60 is integral with the second sandwiching sections 64 each having a relatively large diameter through the four first bridges 62. As in the case of the first sandwiching section 40, the second sandwiching section 64 and the electrolyte electrode assembly 26 have substantially the same size. Each of the second sandwiching sections 64 is integral with an annular second case unit 68 through a short second bridges (other bridges) 66.

A plurality of grooves 70 connected to the fuel gas supply passage 30 is formed radially around the fuel gas supply passage 30, on a surface of the second fuel gas supply unit 60 which is joined to the first fuel gas supply unit 36. The grooves 70 are connected to a circular groove 72, and the circular groove 72 is connected to four fuel gas supply channels (reactant gas supply channels) 74. Each of the fuel gas supply channels 74 extends from the first bridge 62 to a position near substantially the center of the second sandwiching section 64, and terminates at the fuel gas inlet 52 of the first plate 32.

The second case unit 68 includes oxygen-containing gas supply units 56 and bolt insertion holes 58. The oxygen-containing gas supply passages 54 extend through the oxygen-containing gas supply units 56 in the stacking direction. The second case unit 68 has a filling chamber 76 on a surface joined to the first case unit 44, and the filling chamber 76 is filled with the oxygen-containing gas supplied from the oxygen-containing gas supply passages 54.

The filling chamber 76 is connected to the oxygen-containing gas supply channels (other reactant gas supply channels) 78. Each of the oxygen-containing gas channels 78 extends from the second bridge 66 to a position near substantially the center of the second sandwiching section 64, and the front end of the oxygen-containing gas supply channel 78 is connected to an oxygen-containing gas inlet 80 passing through the second sandwiching section 64.

The first plate 32 has the projections 48 formed by, e.g., etching, and the second plate 34 has the grooves 70, the circular groove 72, the fuel gas supply channels 74, the filling chamber 76, and the oxygen-containing gas supply channels 78 formed by, e.g., etching.

As shown in FIG. 3, a deformable elastic channel unit such as an electrically conductive felt member (electrically conductive non-fabric such as metal felt) 84 is provided on a surface of the second plate 34 facing the cathode 22. The felt member 84 forms an oxygen-containing gas channel 86 between the second sandwiching section 64 and the cathode 22. Instead of the felt member 84, for example, a mesh member (electrically conductive fabric such as metal mesh), foamed metal, expanded metal, punching metal, or pressure embossed metal may be used. Exhaust gas channels 88 are provided around the electrolyte electrode assemblies 26 for discharging the fuel gas and the oxygen-containing gas after reaction as an exhaust gas.

Figure 7:
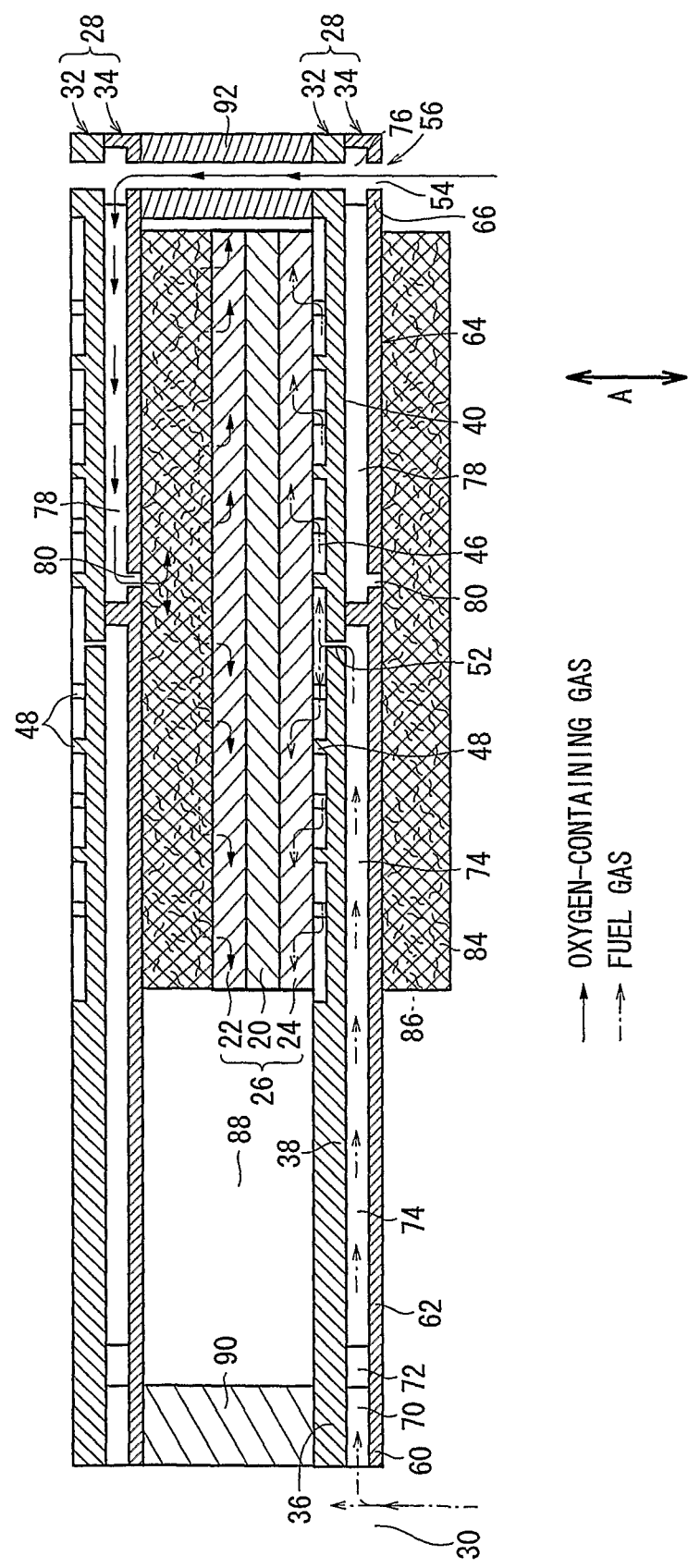
FIG. 7 is a cross sectional view schematically showing operation of the fuel cell.

As shown in FIG. 7, a first insulating seal 90 for sealing the fuel gas supply passage 30 and a second insulating seal 92 for sealing the oxygen-containing gas supply passage 54 are formed between the separators 28. The first insulating seal 90 and the second insulating seal 92 are made of materials such as crustal component material, glass material, and composite material of clay and plastic, for example, since these materials have good sealing performance, and are hard and not collapsed easily. Further, preferably, the second insulating seal 92 is a heat insulating member for preventing diffusion of heat energy.

As shown in FIGS. 1 and 2, the fuel cell stack 12 is formed by providing a first end plate 94a having a substantially circular disk shape, at one end of the fuel cells 10 in the stacking direction, and a partition wall 95, a plurality of second end plates 94b each having a small diameter and a substantially circular disk shape, and a fixing ring 94c having a large diameter and a substantially ring shape, at the other end of the fuel cells 10 in the stacking direction. The partition wall 95 functions to prevent diffusion of the exhaust gas to the outside of the fuel cells 10. The second end plates 94b are provided at four positions corresponding to positions where the electrolyte electrode assemblies 26 are stacked.

The first end plate 94a and the fixing ring 94c have a plurality of holes 96 connected to the bolt insertion holes 58 of the separators 28. By bolts 98 inserted through the holes 96 into the bolt insertion holes 58, and nuts 100 fitted to the bolts 98, the first case units 44 and the second case units 68 of the separators 28 are fixedly tightened to the first end plate 94a.

One fuel gas supply pipe 102 connected to the fuel gas supply passage 30, four oxygen-containing gas supply pipes 104 connected to the oxygen-containing gas supply passages 54, and four exhaust gas discharge pipes 105 connected to the exhaust gas channels 88 are provided at the first end plate 94a.

The first end plate 94a is fixed to a support plate 112 through bolts 98, nuts 108a, 108b, and plate collar members 110. A first load applying unit 114 for applying a tightening load to the first fuel gas supply unit 36 and the second fuel gas supply unit 60, second load applying units 116 for applying a tightening load to the oxygen-containing gas supply units 56, and third load applying units 118 for applying a tightening load to the electrolyte electrode assemblies 26 are provided between the support plate 112 and the first end plate 94a.

The first load applying unit 114 has a presser member 120 provided at the center of the fuel cells 10 (center of the first fuel gas supply unit 36 and the second fuel gas supply unit 60) for preventing leakage of the fuel gas from the fuel gas supply passage 30. The presser member 120 is provided near the center of the four second end plates 94b for pressing the fuel cells 10 through the partition wall 95. A first spring 124 is provided at the presser member 120 through a first receiver member 122a and a second receiver member 122b. A tip end of a first presser bolt 126 contacts the second receiver member 122b. The first presser bolt 126 is screwed into a first screw hole 128 formed in the support plate 112. The position of the first presser bolt 126 is adjustable through a first nut 130.

Each of the second load applying units 116 includes a bolt 98 inserted through the hole 96 into the bolt insertion hole 58, and the nut 100 fitted to the bolt 98. The second load applying unit 116 prevents leakage of the oxygen-containing gas from the oxygen-containing gas supply unit 56.

Each of the third load applying units 118 includes a third receiver member 132a at the second end plate 94b, corresponding to each of the electrolyte electrode assemblies 26. The third receiver member 132a is positioned on the second end plate 94b through a pin 134. One end of the second spring 136 contacts the third receiver member 132a and the other end of the second spring 136 contacts a fourth receiver member 132b. A tip end of the second presser bolt 138 contacts the fourth receiver member 132b. The second presser bolt 138 is screwed into the second screw hole 140 formed in the support plate 112. The position of the second presser bolt 138 is adjustable through the second nut 142.

Operation of the fuel cell stack 12 will be described below.

As shown in FIG. 1, the fuel gas is supplied through the fuel gas supply pipe 102 to the first end plate 94a. Then, the fuel gas flows into the fuel gas supply passage 30. The air as the oxygen-containing gas is supplied from the oxygen-containing gas supply pipes 104 to the first end plate 94a. Then, the oxygen-containing gas flows into the oxygen-containing gas supply units 56.

As shown in FIGS. 4 and 7, the fuel gas supplied to the fuel gas supply passage 30 flows in the stacking direction indicated by the arrow A, and the fuel gas is supplied from the grooves 70 to the fuel gas supply channels 74 through the circular groove 72 formed in the second plate 34 of the separator 28 of each fuel cell 10. After the fuel gas flows along each fuel gas supply channel 74, the fuel gas flows through the fuel gas inlet 52 formed in the first plate 32 to the fuel gas channel 46.

The fuel gas inlet 52 is provided at substantially the central position of the anode 24 of each electrolyte electrode assembly 26. Thus, the fuel gas is supplied from the fuel gas inlet 52 to the anode 24, and flows along the fuel gas channel 46 from the substantially central region to the outer circumferential region of the anode 24.

The air supplied to the oxygen-containing gas supply units 56 temporarily fills the filling chamber 76 provided between the first case unit 44 of the first plate 32 and the second case unit 68 of the second plate 34. The filling chamber 76 is connected to the oxygen-containing gas supply channel 78. The oxygen-containing gas moves toward the center of the first sandwiching section 40 and the second sandwiching section 64 along each of the oxygen-containing gas supply channels 78.

The oxygen-containing containing gas inlet 80 is opened to a position near the center of the second sandwiching section 64. The oxygen-containing gas inlet 80 is positioned at substantially the center of the cathode 22 of the electrolyte electrode assembly 26. Therefore, as shown in FIG. 7, the air is supplied from the oxygen-containing gas inlet 80 to the cathode 22. The oxygen-containing gas flows from the substantially central region to the outer circumferential region of the cathode 22 along the oxygen-containing gas channel 86 formed in the felt member 84.

Thus, in each of the electrolyte electrode assemblies 26, the fuel gas flows from substantially the central region to the outer circumferential region of the anode 24, and the air flows from the substantially central region to the outer circumferential region of the cathode 22 for generating electricity. The fuel gas and the air consumed in the power generation are discharged to the outer circumferential region of each of the electrolyte electrode assemblies 26, and flows through the exhaust gas channels 88.

In the first embodiment, the separator 28 includes the first case unit 44 and the second case unit 68. The outer shape of the separator 28 corresponds to the overall outer dimensions of the fuel cell 10. In the structure, no casing as a separate body containing the fuel cells 10 is required. The number of components is reduced effectively, and assembling operation can be performed efficiently. Further, the size of the fuel cell 10 is reduced, and the fuel cell 10 can be produced at low cost.

Further, the first case unit 44 and the second case unit 68 function as barrier members for preventing diffusion of the exhaust gas discharged from the fuel cell 10 to the outside of the fuel cell 10, and as heat insulating members for preventing diffusion of heat energy. In the structure, it is possible to maintain the temperature of the fuel cell 10, and improve heat efficiency by waste heat collection. Consequently, heat insulating structure is simplified greatly, and economically.

Further, in the presence of the first bridge 38, the load in the stacking direction applied to the first fuel gas supply unit 36 is not transmitted to the first sandwiching section 40, and the load in the stacking direction applied to the first sandwiching section 40 is not transmitted to the first fuel gas supply unit 36. Likewise, in the presence of the first bridge 62, the load in the stacking direction applied to the second fuel gas supply unit 60 is not transmitted to the second sandwiching section 64, and the load in the stacking direction applied to the second sandwiching section 64 is not transmitted to the second fuel gas supply unit 60. In the structure, in the first fuel gas supply unit 36 and the second fuel gas supply unit 60 where highly good sealing performance for preventing leakage of the fuel gas is required, a large surface pressure (load per unit area) is generated by the first load applying unit 114 in comparison with the first sandwiching section 40 and the second sandwiching section 64. In the electrolyte electrode assembly 26, a relatively small surface pressure (load per unit area) is generated by the third load applying unit 118.

Thus, the desired sealing performance in the first fuel gas supply unit 36 and the second fuel gas supply unit 60 is achieved by the first load applying unit 114, while preventing the damage of the electrolyte electrode assembly 26. In the simple and compact structure, the power generation is performed efficiently.

Further, in the first embodiment, in the presence of the second bridge 42, the load in the stacking direction applied to the first sandwiching section 40 is not transmitted to the first case unit 44, and the load in the stacking direction applied to the first case unit 44 is not transmitted to the first sandwiching section 40. Likewise, in the presence of the second bridge 66, the load in the stacking direction applied to the second sandwiching section 64 is not transmitted to the second case unit 68, and the load in the stacking direction applied to the second case unit 68 is not transmitted to the second sandwiching section 64. In the first case unit 44 and the second case unit 68 where highly good sealing performance is required, a large surface pressure (load per unit area) is generated in comparison with the first sandwiching section 40 and the second sandwiching section 64. Thus, the desired sealing performance in the first case unit 44 and the second case unit 68 is achieved while preventing the damage of the electrolyte electrode assemblies 26.

Further, the first case unit 44 and the second case unit 68 have the oxygen-containing gas supply units 56, and oxygen-containing gas supply passages 54 for supplying the oxygen-containing gas to the oxygen-containing gas supply channels 78 extend through the oxygen-containing gas supply units 56 in the stacking direction. In the structure, in each of the first fuel gas supply unit 36, the second fuel gas supply unit 60, and the oxygen-containing gas supply units 56, the flow rates of the fuel gas and the oxygen-containing gas supplied to each of the electrolyte electrode assemblies 26 is finely adjusted. Consequently, the amounts of the fuel gas and the oxygen-containing gas which are not consumed in the power generation are reduced suitably, and it becomes possible to perform power generation operation of the fuel cell 10 efficiently and economically.

Further, the first case unit 44 and the second case unit 68 are heated by the exhaust gas discharged to the exhaust gas channels 88 after power generation reaction. Therefore, the oxygen-containing gas is heated before it is supplied to the electrolyte electrode assemblies 26.

The filling chamber 76 temporarily filled with the oxygen-containing gas from the oxygen-containing gas supply passages 54 is formed between the first case unit 44 and the second case unit 68. In the structure, in the filling chamber 76, the oxygen-containing gas is heated suitably by the exhaust gas. Therefore, self-heating operation is facilitated in the entire fuel cell 10, and heat energy is utilized efficiently.

Further, the separator 28 includes the first plate 32 having the fuel gas inlet 52 and the second plate 34 having the fuel gas supply channel 74, the oxygen-containing gas inlet 80, the oxygen-containing gas supply channel 78, and the filling chamber 76. For example, the first plate 32 and the second plate 34 are stacked together by diffusion bonding.

Therefore, the first plate 32 can be fabricated simply, and the fabrication steps are mainly focused only on the second plate 34. By increasing or decreasing the number of fabrication steps, the first plate 32 and the second plate 34 as separate bodies are fabricated independently from each other. The production cost is reduced, and improvement in the yield rate is achieved easily.

The first case unit 44 and the second case unit 68 have annular structure. In the structure, the waste heat from the exhaust gas is transmitted to the entire first case unit 44 and the entire second case unit 68 uniformly. Thus, it is possible to uniformly heat the oxygen-containing gas before it is supplied to the electrolyte electrode assemblies 26.

Further, the electrolyte electrode assemblies 26 are provided at equal intervals (angles) around the fuel gas supply passage 30. In the structure, the fuel gas can be distributed uniformly from the fuel gas supply passage 30 to the electrolyte electrode assemblies 26. Improvement in the performance and stability in the power generation is achieved in each of the electrolyte electrode assemblies 26.

Further, the electrolyte electrode assemblies 26 are arranged on a circle concentric with the fuel gas supply passage 30. In the structure, the fuel gas can be uniformly distributed from the fuel gas supply passage 30 to each of the electrolyte electrode assemblies 26. Improvement in the performance and stability in the power generation is achieved in each of the electrolyte electrode assemblies 26.

Further, the number of the first bridges 38 and the number of the first bridges 62 are the same as the number of the electrolyte electrode assemblies 26. In the structure, it is possible to uniformly distribute the fuel gas from the fuel gas supply passage 30 to each of the electrolyte electrode assemblies 26 through the fuel gas supply channels 74 between the first bridges 38, 62. Improvement in the performance and stability in the power generation is achieved in each of the electrolyte electrode assemblies 26.

Further, the number of the first sandwiching sections 40 and the number of the second sandwiching sections 64 are the same as the number of the electrolyte electrode assemblies 26. In the structure, the fuel gas from the fuel gas supply passage 30 is equally distributed to each of the first sandwiching sections 40, the second sandwiching sections 64, and the electrolyte electrode assemblies 26. Improvement in the performance and stability in the power generation is achieved in each of the electrolyte electrode assemblies 26.

Further, the load in the stacking direction is not transmitted between the first sandwiching section 40 and the first case unit 44, and between the second sandwiching section 64 and the second case unit 68, by means of the second bridges 42, 66, respectively. Thus, in the first case unit 44 and the second case unit 68 where highly good sealing performance is required, a large surface pressure (load per unit area) is generated in comparison with the first sandwiching section 40 and the second sandwiching section 64. Thus, the desired sealing performance in the first case unit 44 and the second case unit 68 is achieved while preventing the damage of the electrolyte electrode assembly 26.

Further, the number of the oxygen-containing gas supply passages 54 is the same as the number of the electrolyte electrode assemblies 26. Thus, the oxygen-containing gas can be distributed uniformly from the oxygen-containing gas supply passages 54 to the electrolyte electrode assemblies 26. Improvement in the performance and stability in the power generation is achieved in each of the electrolyte electrode assemblies 26.

Further, in a radial direction, the fuel gas supply passage 30, the first bridges 38, 62, the first sandwiching section 40, and the second sandwiching section 64 are arranged in a straight line along the separator surface. In the structure, it is possible to supply the fuel gas suitably from the fuel gas supply passage 30 to the electrolyte electrode assembly 26. Improvement in the performance and stability in the power generation is achieved in each of the electrolyte electrode assemblies 26.

Further, in a radial direction, the fuel gas supply passage 30, the first bridges 38, 62, the first sandwiching section 40, the second sandwiching section 64, the second bridges 42, 66 are arranged in a straight line along the separator surface. In the structure, it is possible to supply the fuel gas suitably from the fuel gas supply passage 30 to the electrolyte electrode assembly 26. Improvement in the performance and stability in the power generation is achieved in each of the electrolyte electrode assemblies 26. Further, it is possible to heat the oxygen-containing gas and the fuel gas, and thus, heat energy is utilized efficiently.

Further, in a radial direction, the fuel gas supply passage 30, the first bridges 38, 62, the first sandwiching section 40, the second sandwiching section 64, the second bridges 42, 66, and the oxygen-containing gas supply passage 54 are arranged in a straight line along the separator surface. In the structure, it is possible to suitably supply the fuel gas and the oxygen-containing gas to each of the electrolyte electrode assemblies 26. Improvement in the performance and stability in the power generation is achieved in each of the electrolyte electrode assemblies 26.

Figure 8:
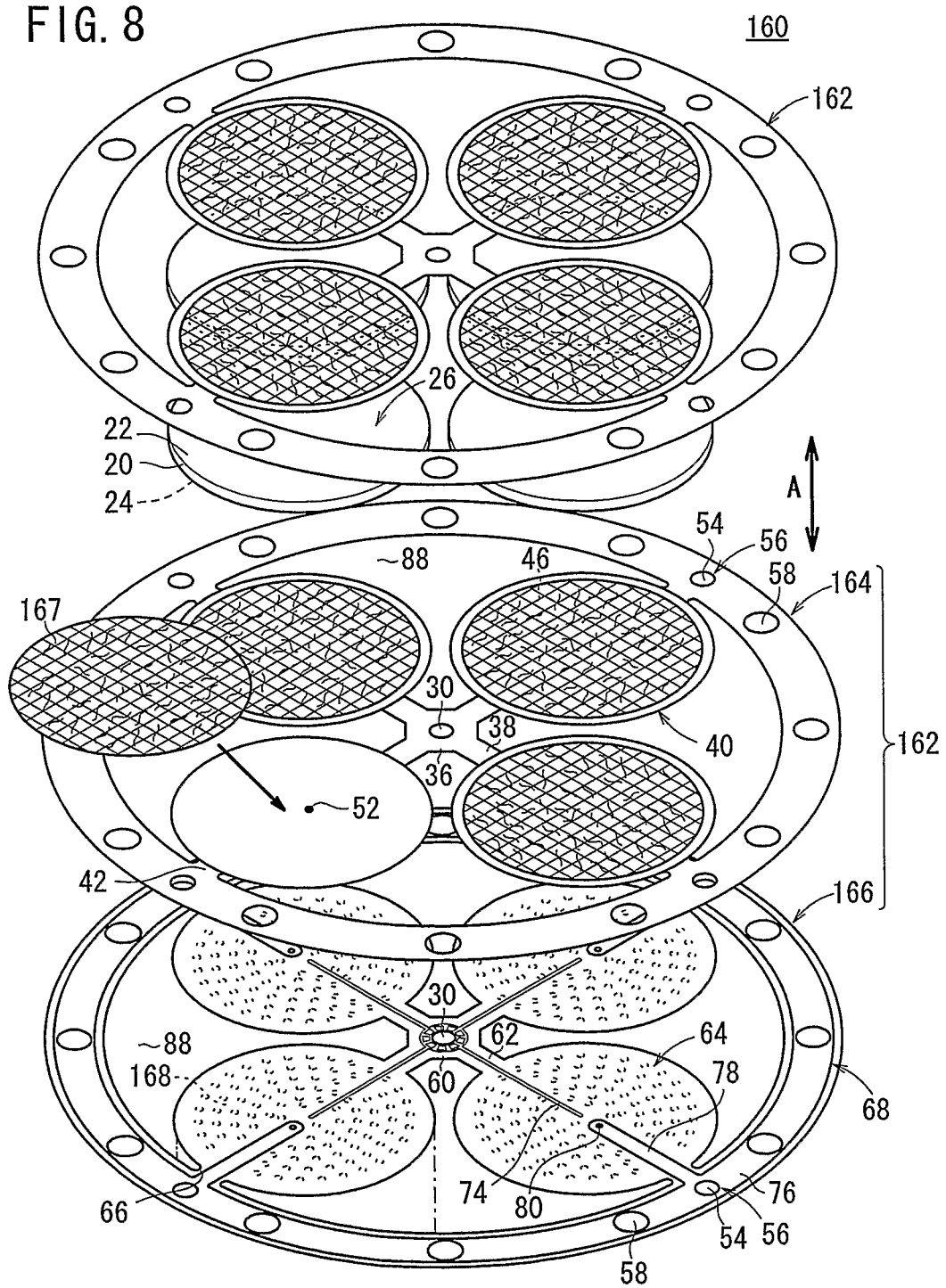
FIG. 8 is an exploded perspective view showing a fuel cell according to a second embodiment of the present invention.
Figure 9:
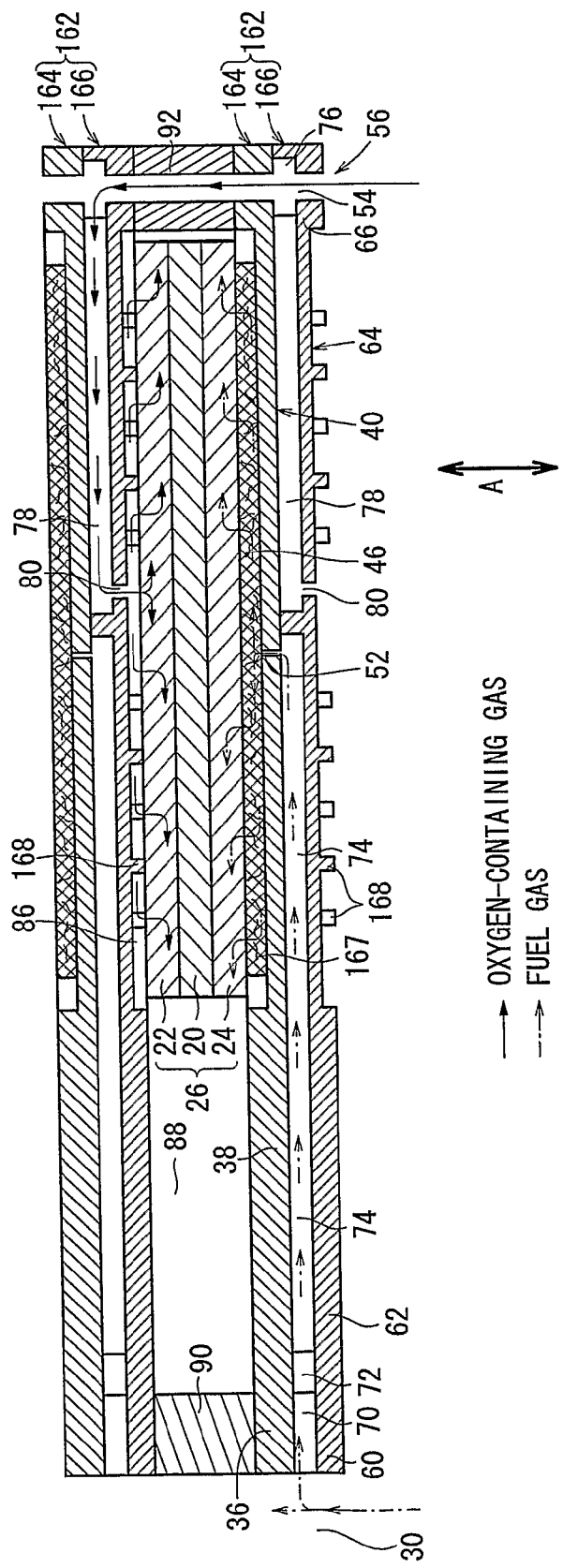
FIG. 9 is a cross sectional view schematically showing operation of the fuel cell.

FIG. 8 is an exploded perspective view showing a fuel cell 160 according to a second embodiment. FIG. 9 is a schematic cross sectional view showing operation of the fuel cell 160. The constituent elements that are identical to those of the fuel cell 10 according to the first embodiment are labeled with the same reference numerals, and descriptions thereof will be omitted. Further, in third to eighth embodiments as described later, the constituent elements that are identical to those of the fuel cell 10 according to the first embodiment are labeled with the same reference numerals, and descriptions thereof will be omitted.

The fuel cell 160 has a separator 162 including a first plate 164 and a second plate 166. Each of the first sandwiching sections 40 of the first plate 164 has a planar surface which contacts the electrolyte electrode assemblies 26, an electrically conductive felt member (electrical conductive non-fabric such as metal felt) 167 is provided on the planar surface. The felt member 167 forms a fuel gas channel 46 for supplying the fuel gas along the electrode surface of the anode 24, and tightly contacts the anode 24 (see FIGS. 8 and 9). Instead of the electrically conductive felt member, for example, a mesh member (electrically conductive fabric such as metal mesh), foamed metal, expanded metal, punching metal, pressure embossed metal may be used.

The second plate 166 includes second sandwiching sections 64, and each of the second sandwiching sections 64 includes a plurality of projections 168 on a surface which contacts the cathode 22. The projections 168 form an oxygen-containing gas channel 86. The projections 168 are formed by, e.g., etching.

As described above, in the second embodiment, by deformation of the felt member 167, for example, the felt member 167 tightly contacts the anode 24 advantageously.

Figure 10:
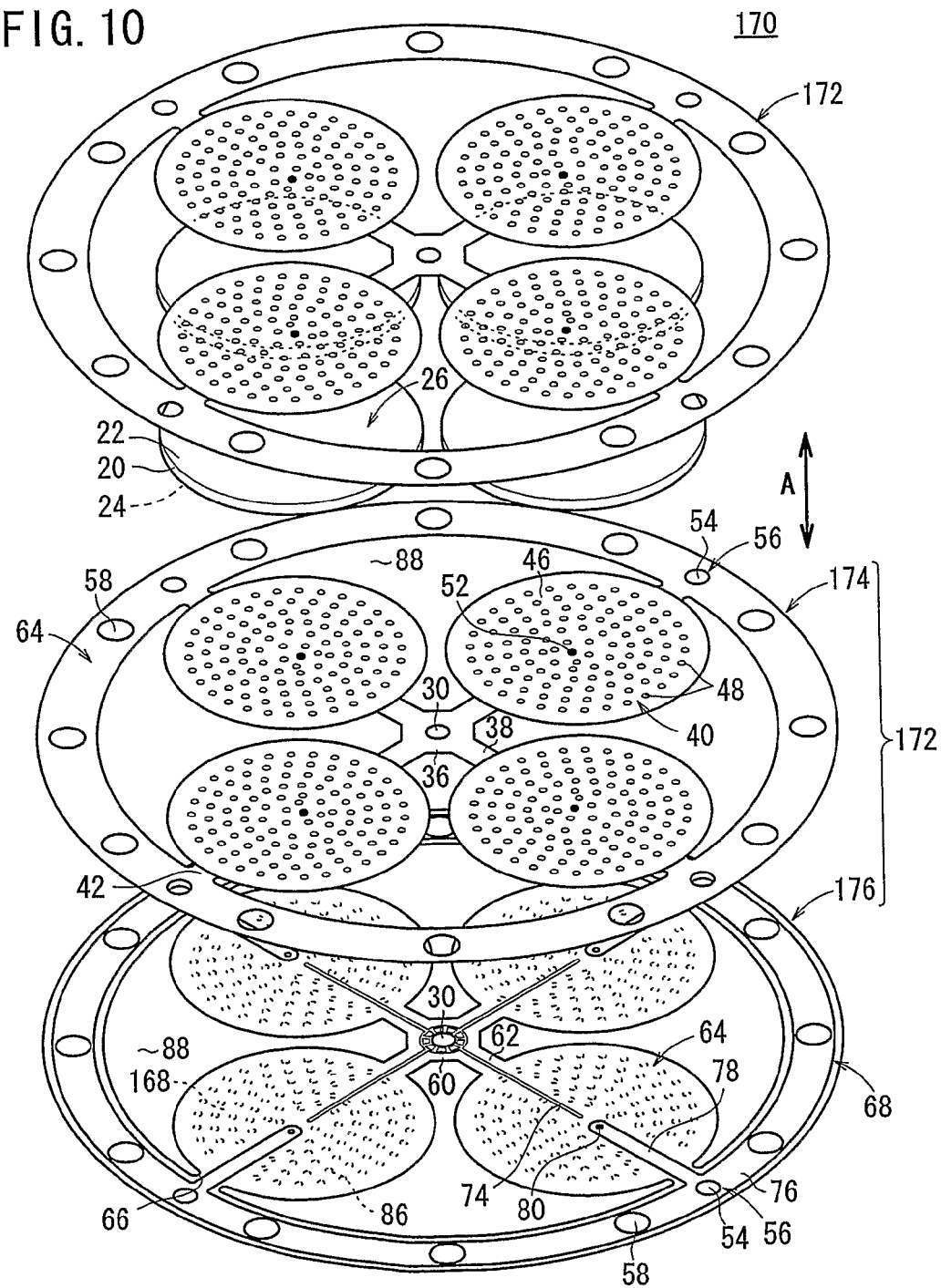
FIG. 10 is an exploded perspective view showing a fuel cell according to a third embodiment of the present invention.
Figure 11:
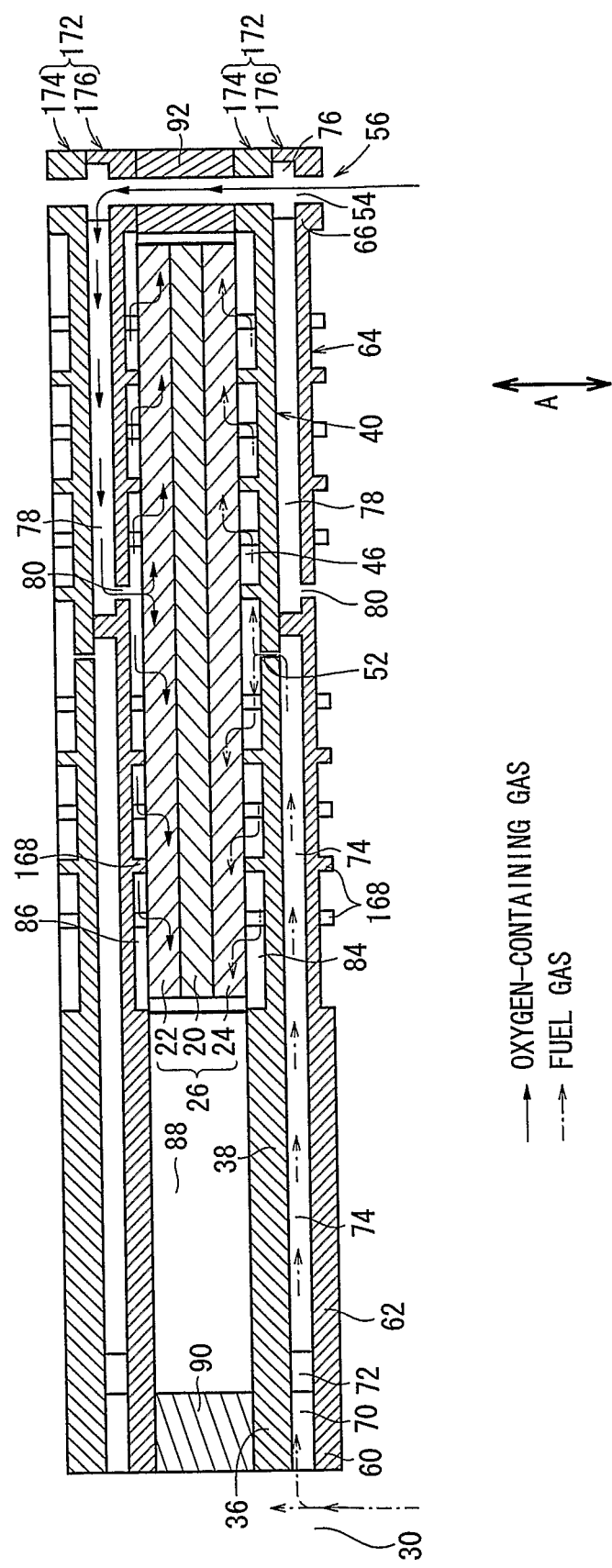
FIG. 11 is a cross sectional view schematically showing operation of the fuel cell.

FIG. 10 is an exploded perspective view showing a fuel cell 170 according to a third embodiment of the present invention. FIG. 11 is a schematic cross sectional view showing operation of the fuel cell 170.

The fuel cell 170 has a separator 172 including a first plate 174 and a second plate 176. A plurality of projections 48 are formed on a surface of each first sandwiching section 40 of the first plate 174 which contacts the anode 24. The projections 48 form the fuel gas channel 46. A plurality of projections 168 are formed on a surface of each second sandwiching section 64 of the second plate 176 which contacts the cathode 22. The projections 168 form the oxygen-containing gas channel 86.

In the third embodiment, the same advantages as in the cases of the first and second embodiments can be obtained. For example, distortion of the electrolyte electrode assemblies 26 and the separator 172 is reduced by the projections 48, 168, and the fuel gas and the oxygen-containing gas flow uniformly.

Structure of the first and second embodiments may be combined to use the felt member (electrically conductive non-fabric such as metal felt) 84 forming the oxygen-containing gas channel 86 and the felt member (electrically conductive non-fabric such as metal felt) 167 forming the fuel gas channel 46. Instead of the felt members 84, 167, for example, a mesh member (electrically conductive fabric such as metal mesh), foamed metal, expanded metal, punching metal, pressure embossed metal may be used.

Figure 12:
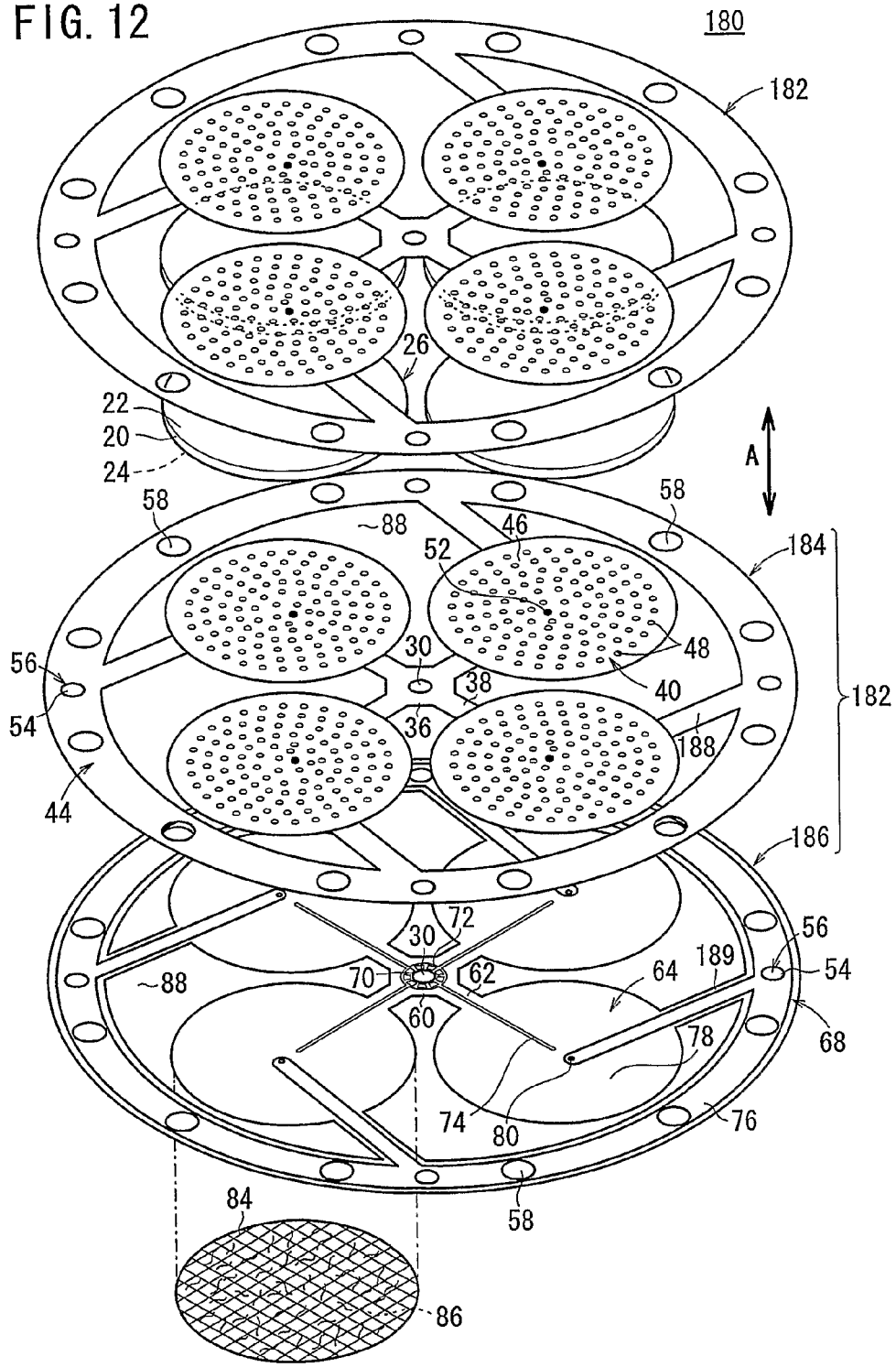
FIG. 12 is an exploded perspective view showing a fuel cell according to a fourth embodiment of the present invention.

FIG. 12 is an exploded perspective view showing a fuel cell 180 according to a fourth embodiment of the present invention.

The fuel cell 180 has a separator 182 including a first plate 184 and a second plate 186. In the first plate 184, the first sandwiching sections 40 and the first case unit 44 are integral with second bridges (other bridges) 188. Each of the second bridges 188 extends in a direction which intersects a straight line connecting the fuel gas supply passage 30 to the first bridge 38.

In the second plate 186, the second sandwiching sections 64 and the second case unit 68 are integral with second bridges (other bridges) 189. As in the case of the second bridge 188, the second bridge 189 extends in a direction which intersects a straight line connecting the fuel gas supply passage 30 to the first bridge 62.

Figure 13:
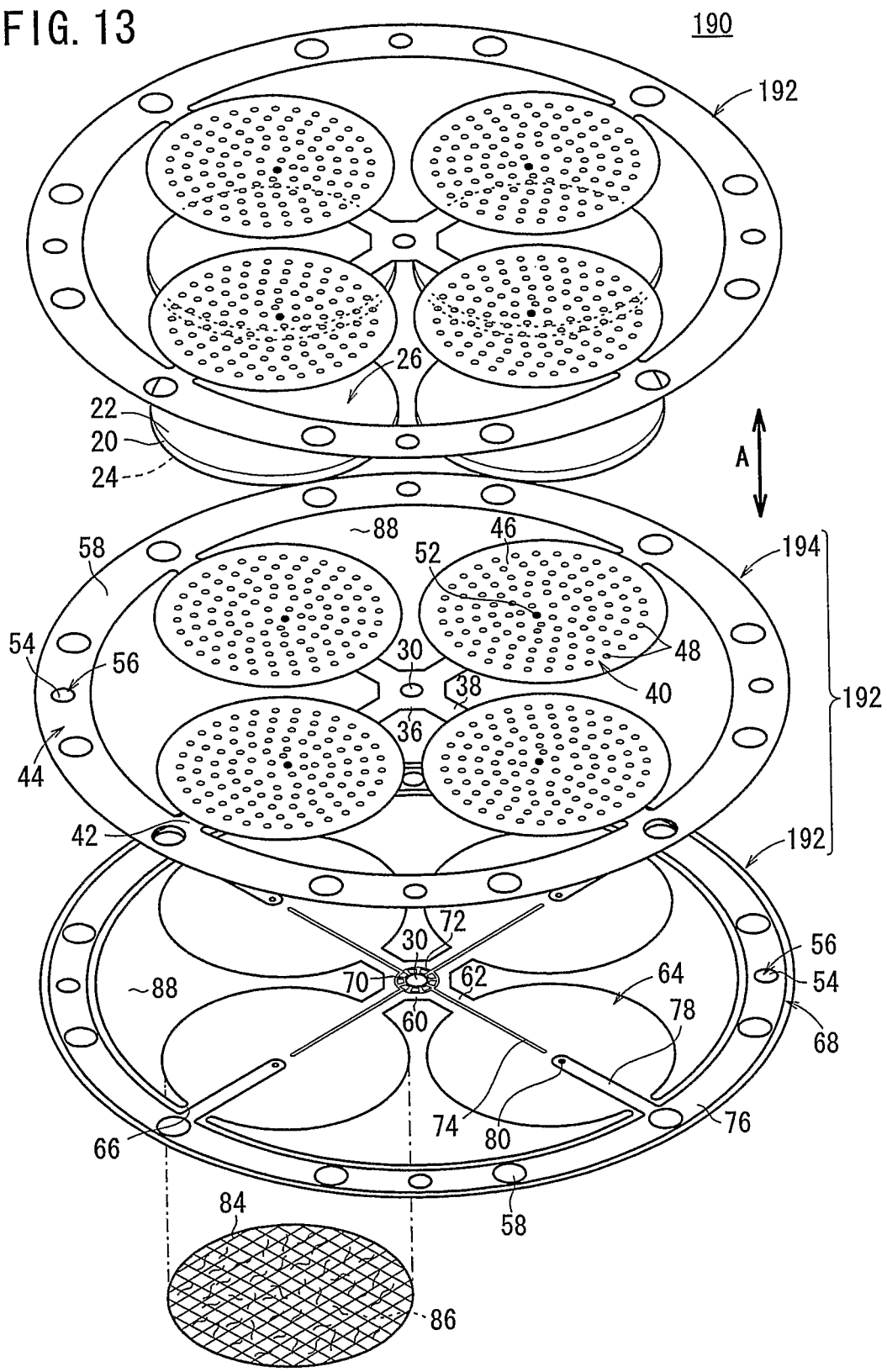
FIG. 13 is an exploded perspective view showing a fuel cell according to a fifth embodiment of the present invention.

FIG. 13 is an exploded perspective view showing a fuel cell 190 according to a fifth embodiment of the present invention.

The fuel cell 190 has a separator 192 including a first plate 194 and a second plate 196. The first case unit 44 of the first plate 194 has oxygen-containing gas supply passages 54 between the second bridges 42, e.g., at substantially intermediate positions. Likewise, the second case unit 68 of the second plate 196 has the oxygen-containing gas supply passage 54 between the second bridges 66, e.g., at substantially intermediate positions.

In the fourth and fifth embodiments, the same advantages as in the cases of the first to third embodiments can be obtained.

Figure 14:
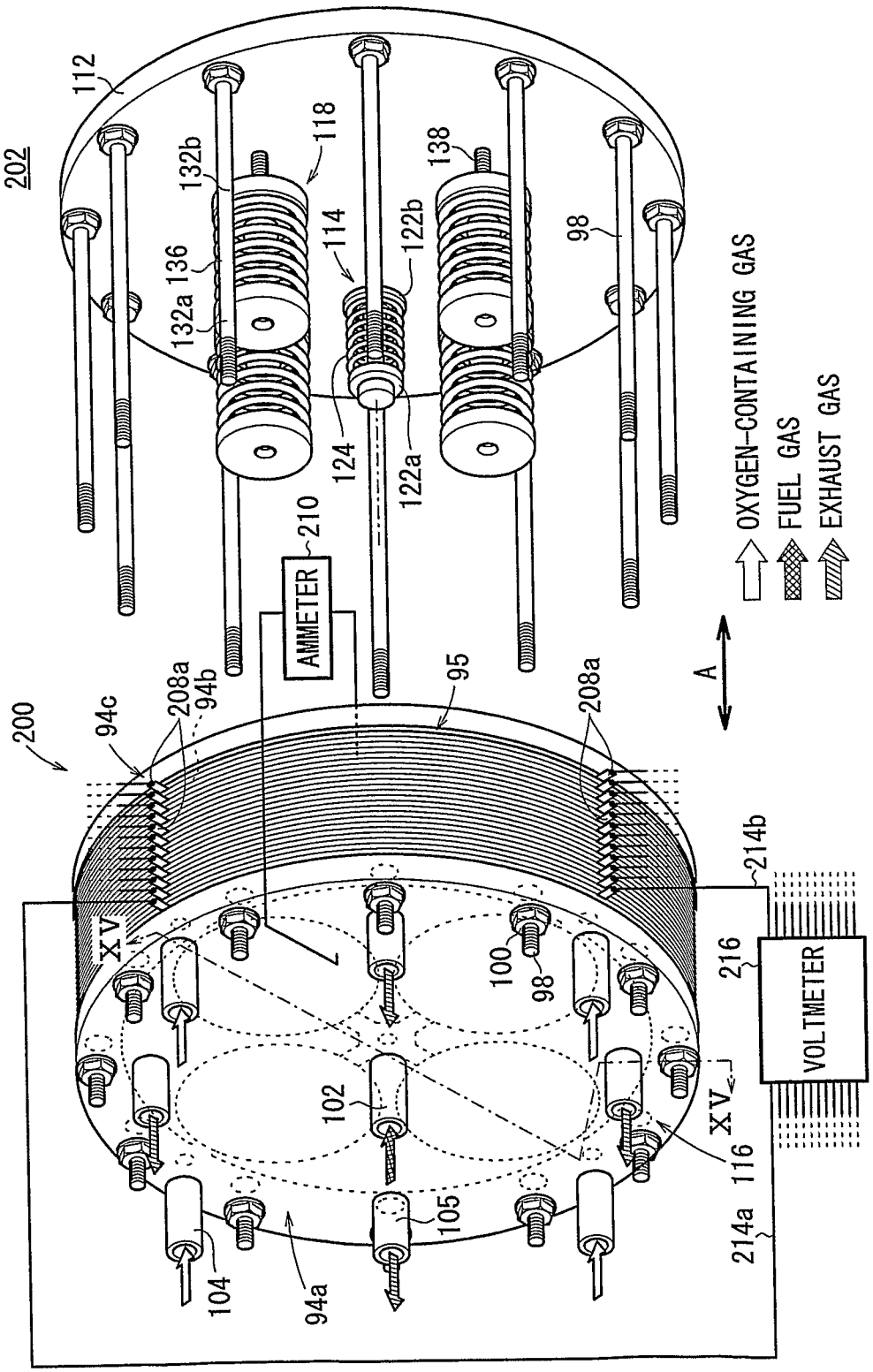
FIG. 14 is a perspective view showing a fuel cell stack according to a sixth embodiment of the present invention.
Figure 15:
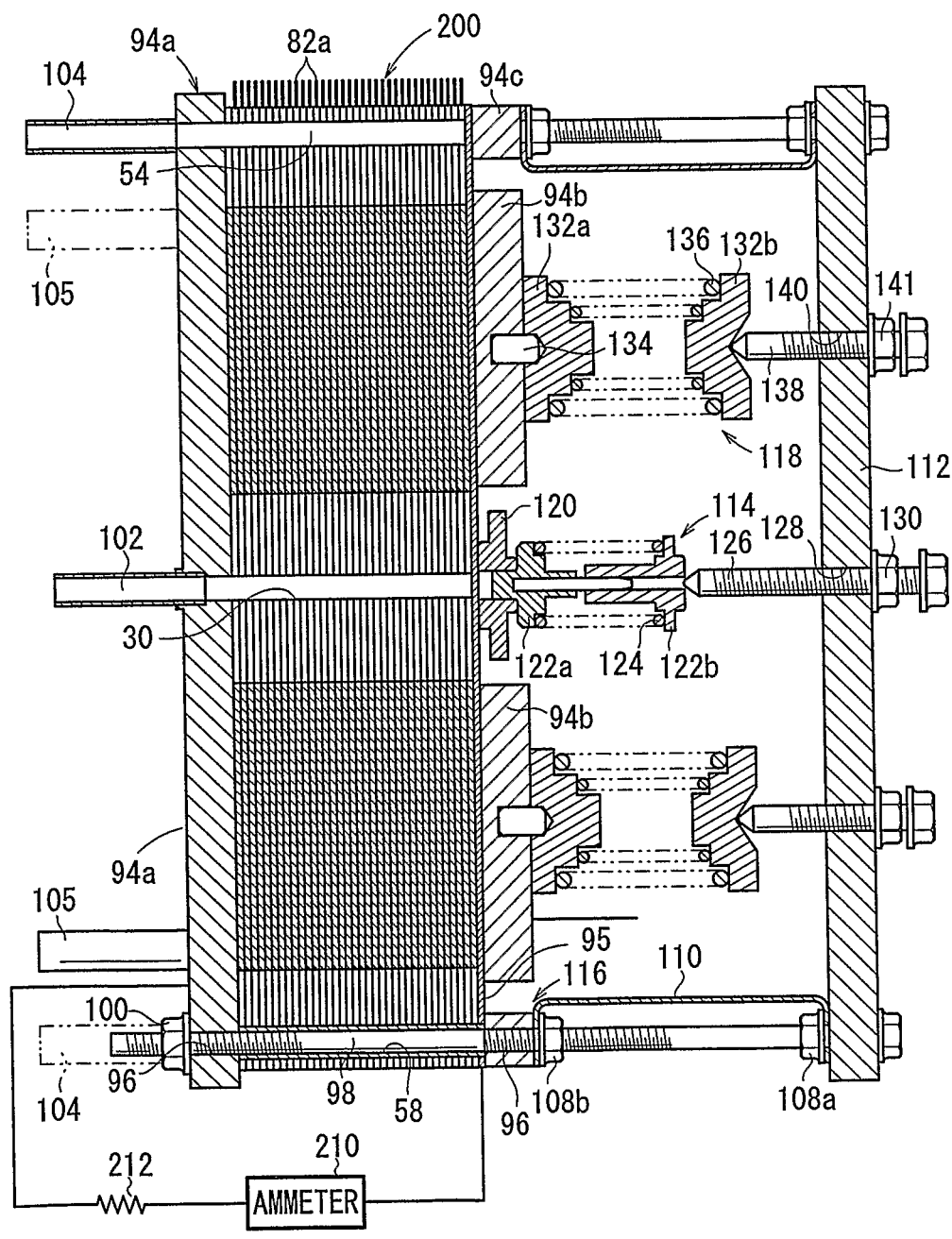
FIG. 15 is a cross sectional view showing the fuel cell stack, taken along a line XV-XV in FIG. 14.

FIG. 14 is a perspective view schematically showing a fuel cell stack 202 formed by stacking a plurality of fuel cells 200 according to a sixth embodiment of the present invention in a direction indicated by an arrow A. FIG. 15 is a cross sectional view showing the fuel cell stack 202, taken along a line XV-XV in FIG. 1.

Figure 16:
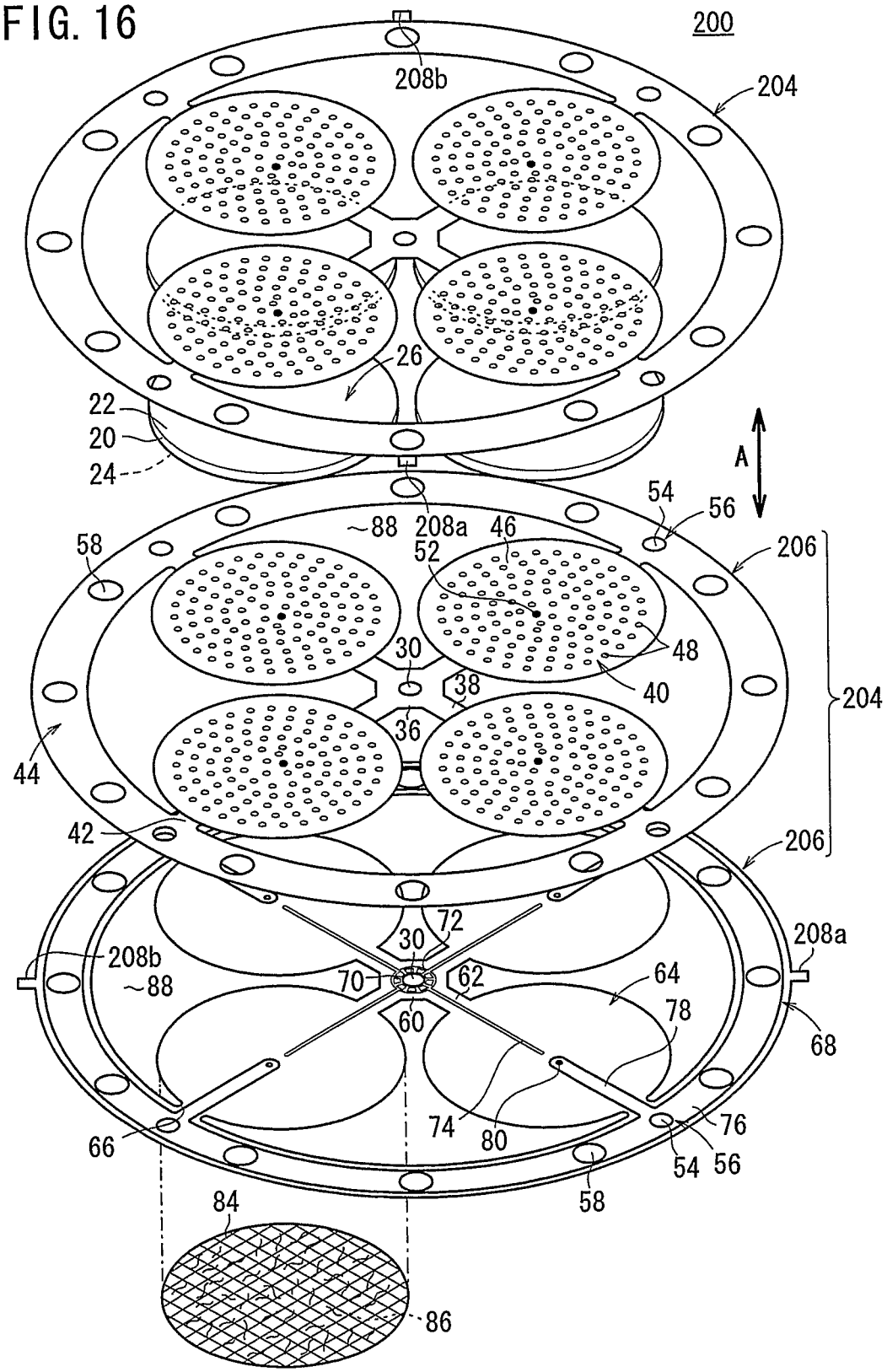
FIG. 16 is an exploded perspective view showing a fuel cell of the fuel cell stack.

As shown in FIG. 16, the fuel cell 200 includes a separator 204. The separator 204 has a second plate 206, and the second plate 206 has at least one, e.g., two extensions 208a, 208b diagonally, at the outer circumferential portion of the second case unit 68, for collecting the voltage obtained by power generation in the electrolyte electrode assemblies 26.

As shown in FIGS. 14 and 15, the first end plate 94a and the second end plate 94b are connected to an ammeter 210 for measuring the overall current generated in the fuel cell stack 12 through a resistor 212.

As shown in FIG. 14, a voltmeter (voltage meter) 216 is connected to the extensions 208a of the fuel cells 200 stacked in the direction indicated by the arrow A through wirings 214a, 214b. By the voltmeter 216, the voltage between the fuel cell 200 of a first layer and the fuel cell 200 of a second layer, the voltage between the fuel cell 200 of the second layer and the fuel cell 200 of a third layer, and the subsequent voltages between the adjacent fuel cells 200 from the fuel cell 200 of a fourth layer are measured successively. Thus, it is possible to detect whether the voltages between the respective fuel cells 200 have predetermined voltages or not. Instead of measuring the voltage between the adjacent fuel cells 200, it is possible to measure the voltage between a predetermined number of fuel cells 200.

In the fuel cell stack 202, the separator 204 is formed integrally with the first case unit 44, and the second case unit 68. The overall outer dimensions of the fuel cells 200 depend on the outer shape of the separator 204. Further, extensions 208a (or 208b) as terminals for collecting the voltage obtained by power generation of the electrolyte electrode assemblies 26 are provided in the outer circumferential portion of the second case unit 68.

In the structure, no conventional through holes for insertion of wirings are required in the casing containing the fuel cell stack. Thus, operation of forming the through holes, and operation of attaching seal material or heat insulating material to the through holes is not required. Thus, overall operation can be carried efficiently and economically.

Further, the first case unit 44 and the second case unit 68 function as barrier members for preventing diffusion of the exhaust gas discharged from the fuel cells 200 to the outside of the fuel cells 200, and as heat insulating members for preventing diffusion of heat energy. Therefore, the extensions 208a, 208b, and the wirings 214a, 214b provided in the outer circumferential portion of the second case unit 68 are not exposed to the hot temperature by the power generation reaction of the fuel cells 200 or the exhaust gas. Thus, it is possible to prevent corrosion or the like of the extensions 208a, 208b, and the wirings 214a, 214b. Improvement in the durability is achieved easily, and the voltage measurement operation is performed efficiently.

Further, since corrosion of the extensions 208a, 208b, and the wirings 214a, 214b does not occur, it is possible to easily measure the power generation condition of each of the separators 204. Further, it is possible to detect the position where any failure occurs, e.g., it is possible to detect which separator 204 has the voltage drop. Thus, reliability in the voltage measurement is improved.

Further, in the sixth embodiment, the extensions 208a, 208b are provided at diagonal positions in the outer circumferential portion of the second case unit 68. Therefore, for example, one extension 208a can be used as a terminal for voltage measurement, and the other extension 208b can be used for positioning the separator 204.

In the adjacent fuel cells 200, the extensions 208a can be provided out of phase with each other by 90° (or) 180°. Thus, the extension 208a are not positioned adjacent to each other in the stacking direction. For example, even if the extensions 208a are deformed, the adjacent extensions 208a do not contact each other, and short-circuiting can be prevented reliably.

Further, since the two extensions 208a, 208b are provided, when the separators 204 are stacked together, and fixedly positioned by the extension 208b, rotation of the separators 204 does not occur. Therefore, the fuel cells 200 can be positioned accurately and reliably. Further, for example, by counting the number of the extensions 208b, it is possible to recognize the number of the stacked fuel cells 200.

Figure 17:
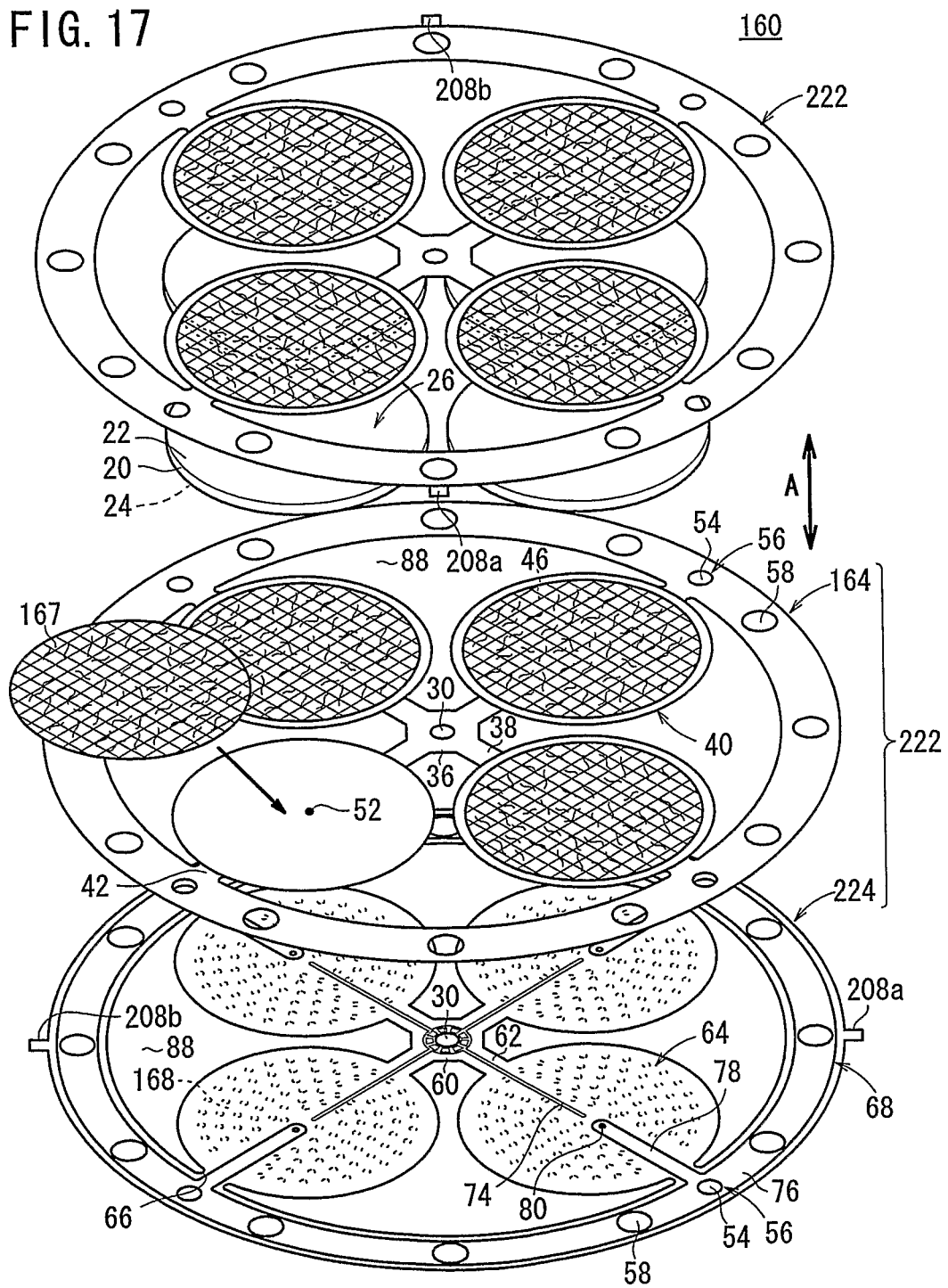
FIG. 17 is an exploded perspective view showing a fuel cell of a fuel cell stack according to a seventh embodiment of the present invention.

FIG. 17 is an exploded perspective view showing a fuel cell 200 of a fuel cell stack according to a seventh embodiment of the present invention.

The structure of the fuel cell 220 is the same as that of the fuel cell 160. The fuel cell 220 has a separator 222 including a first plate 164 and a second plate 226. The extensions 208a, 208b are provided in the outer circumferential portion of the second case unit 68 of the second plate 166.

Figure 18:
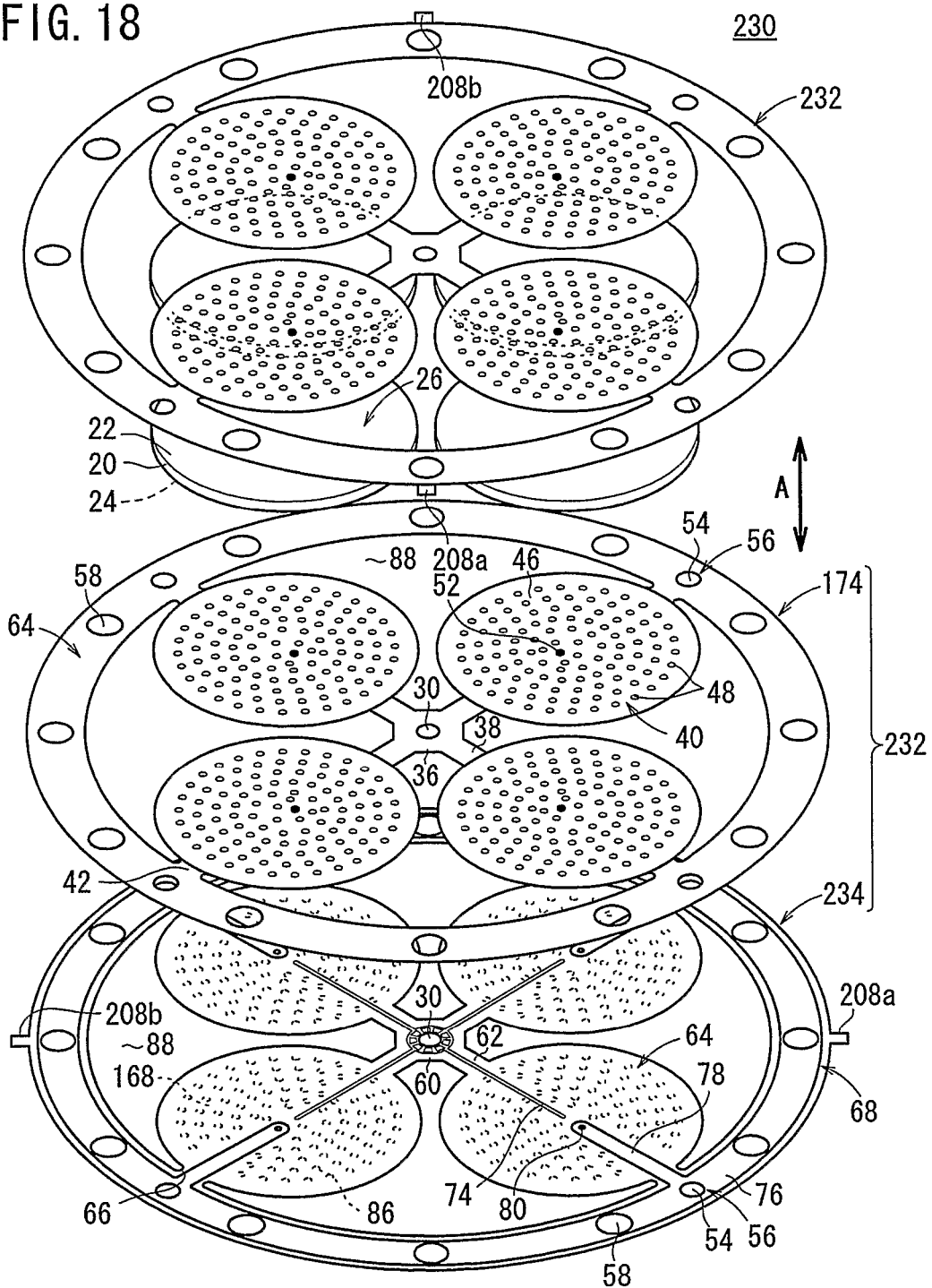
FIG. 18 is an exploded perspective view showing a fuel cell of a fuel cell stack according to an eighth embodiment of the present invention.

FIG. 18 is an exploded perspective view showing a fuel cell 230 according to an eighth embodiment of the present invention. The structure of the fuel cell 230 is the same as that of the fuel cell 170 according to the third embodiment.

The fuel cell 230 has a separator 232 including a second plate 234, and extensions 208a, 208b are provided in the outer circumferential portion of the second case unit 68 of the second plate 234.

In the seventh and eighth embodiments, since the extensions 208a, 208b are provided in the outer circumferential portion of the second case unit 68, the same advantages as in the case of the sixth embodiment can be obtained.

Figure 19:
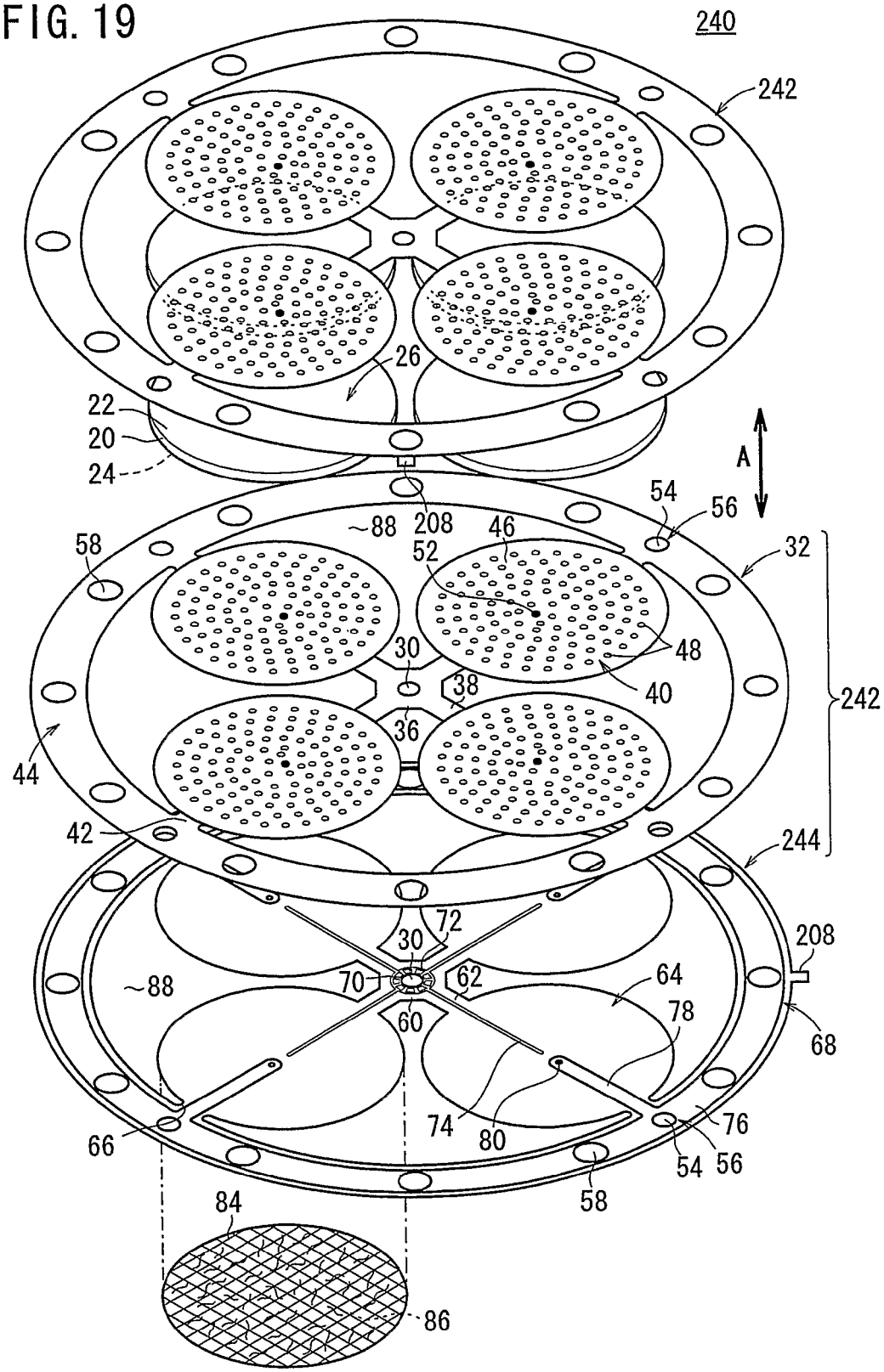
FIG. 19 is an exploded perspective view showing a fuel cell of a fuel cell stack according to a ninth embodiment of the present invention.

FIG. 19 is an exploded perspective view showing a fuel cell 240 of a fuel cell stack according to a ninth embodiment. The structure of the fuel cell 240 is the same as that of the fuel cell 180 according to the fourth embodiment.

The fuel cell 240 has a separator 242 including a first plate 32 and a second plate 244. A single extension 208 is provided in the outer circumferential portion of the second case unit 68 of the second plate 244.

In the ninth embodiment, first, the separator 242 of a first layer is positioned based on the extension 208. The extension 208 of the separator 242 of a second layer is positioned out of phase from the extension 208 of the separator 242 in the first layer by 90°. Further, in the same manner, the separators 242 from the separator 242 in the third layer are stacked together such that the extensions 208 of the separators 242 are out of phase from the extensions 208 of the adjacent separators 242 by 90°.

Since the separators 242 are stacked together based on the positions of the extensions 208, the positioning operation can be performed accurately without any mistakes of orientations of the separators 242. Further, the same advantages as in the case of the sixth embodiment can be obtained. For example, it is possible to recognize the number of stacked separators 242 easily.

The ninth embodiment adopts substantially the structure of the sixth embodiment. Alternatively, the ninth embodiment may adopt the structure of the seventh embodiment or the eighth embodiment. Also in the tenth embodiment as described later, the structure of the seventh or the eight embodiment can be adopted.

Figure 20:
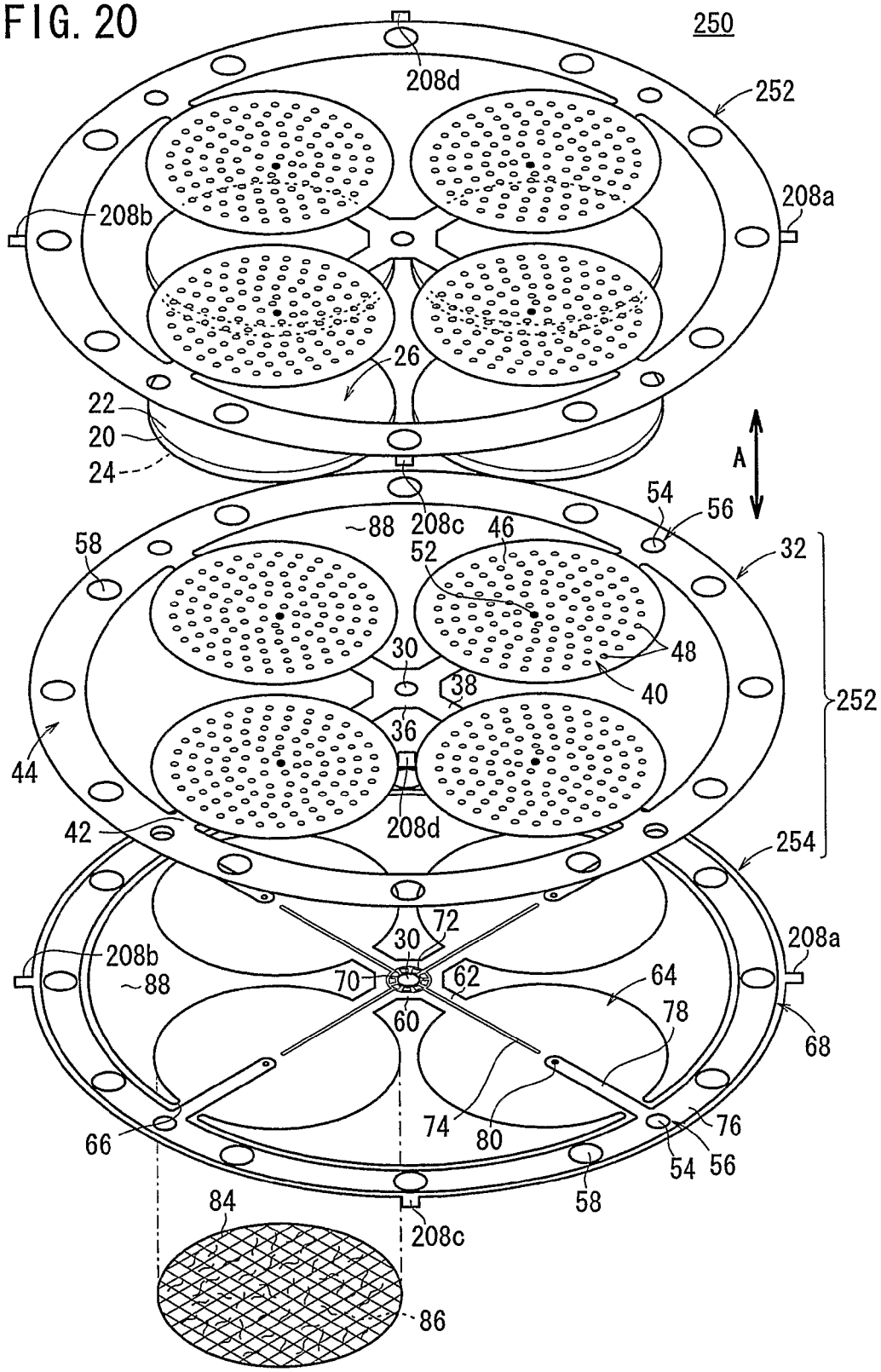
FIG. 20 is an exploded perspective view showing a fuel cell of a fuel cell stack according to a tenth embodiment of the present invention.
Figure 21:
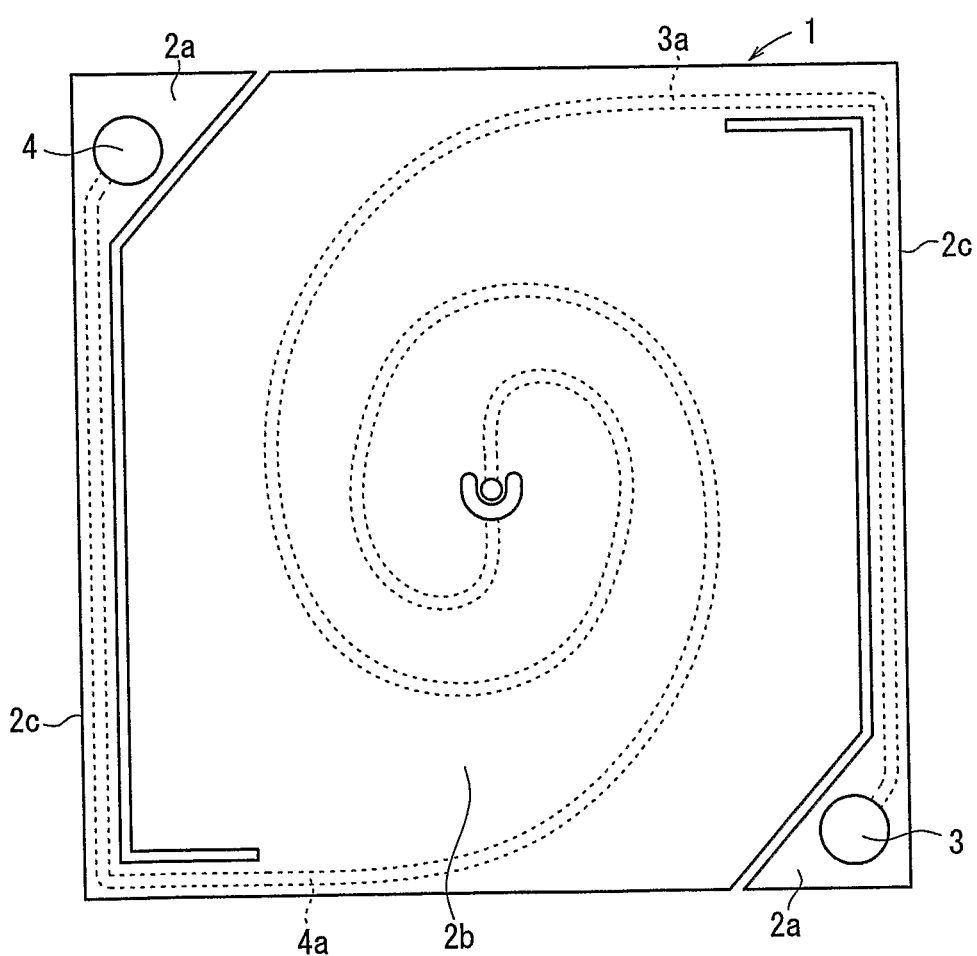
FIG. 21 is a cross sectional view showing a conventional flat stack fuel cell.
Figure 22:
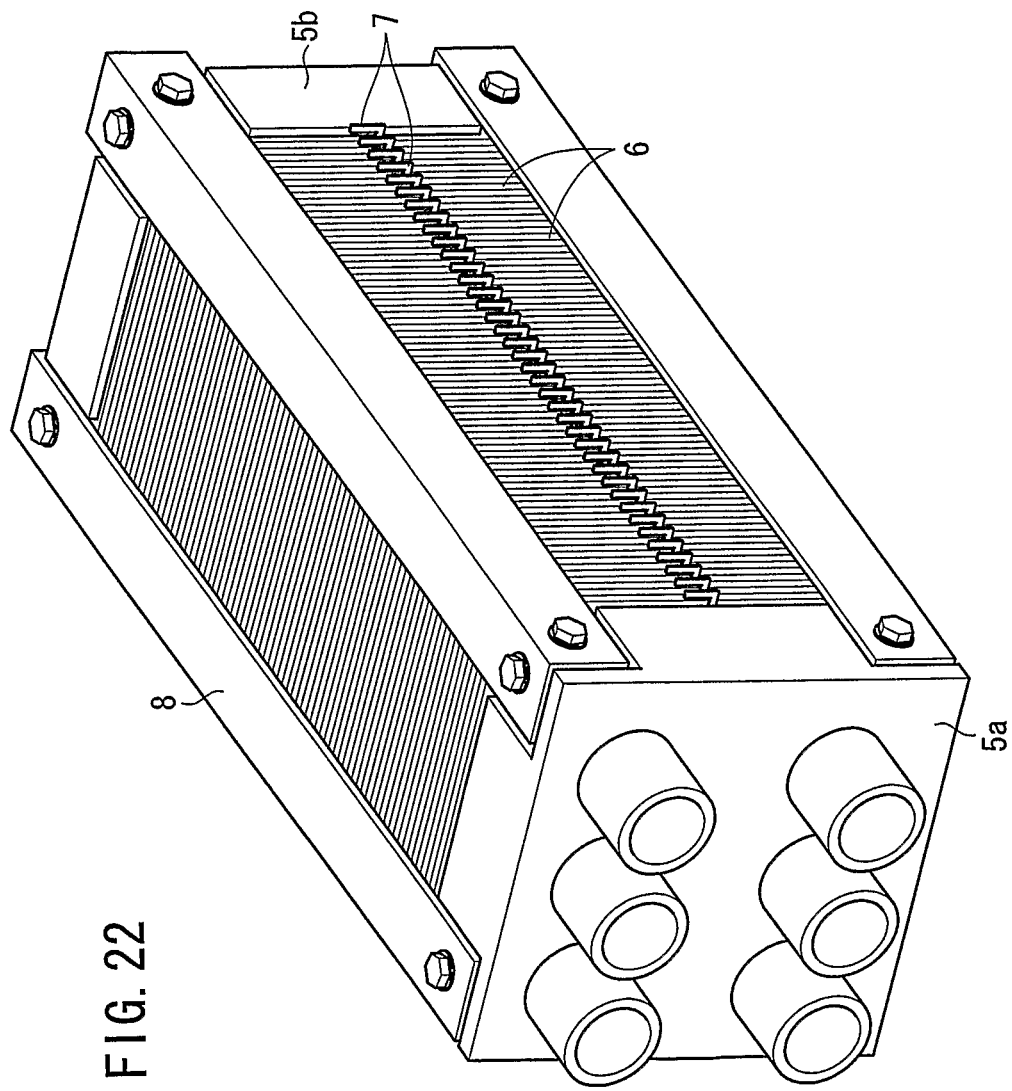
FIG. 22 is a perspective view schematically showing another conventional fuel cell stack.

FIG. 20 is an exploded perspective view showing a fuel cell 250 of a fuel cell stack according to a tenth embodiment of the present invention. The structure of the fuel cell 250 is the same as that of the fuel cell 190 according to the fifth embodiment.

The fuel cell 250 has a separator 252 having a first plate 32 and a second plate 254. A plurality of, e.g., four extensions 208a to 208d are provided at equal intervals in the outer circumferential portion of the second case unit 68 of the second plate 254.

In the tenth embodiment, the extensions 208a to 208d are provided at equal intervals (angles) in the outer circumferential portion of the second case unit 68. Therefore, for example, one extension 208a can be used as a terminal for voltage measurement, and the other extensions 208b to 208d can be used selectively for positioning the separator 252. Thus, the same advantages as in the cases of the sixth to ninth embodiments can be obtained. For example, the separators 252 can be positioned with respect to each other accurately and easily, and it is possible to recognize the number of the stacked separators 252.

The invention claimed is:

1. A fuel cell formed by stacking electrolyte electrode assemblies between separators, said electrolyte electrode assemblies each including an anode, a cathode, and an electrolyte interposed between said anode and said cathode, said separators each comprising:
sandwiching sections for sandwiching said electrolyte electrode assemblies, at least a fuel gas inlet for supplying a fuel gas along an electrode surface of said anode or an oxygen-containing gas inlet for supplying an oxygen-containing gas along an electrode surface of said cathode being formed in each of said sandwiching sections;
bridges connected to said sandwiching sections, and each having a reactant gas supply channel for supplying the fuel gas to said fuel gas inlet or supplying the oxygen-containing gas to said oxygen-containing gas inlet; and
a reactant gas supply unit connected to said bridges, a reactant gas supply passage extending through said reactant gas supply unit in a stacking direction for supplying the fuel gas or the oxygen-containing gas to said reactant gas supply channel,
wherein a case unit containing said electrolyte electrode assemblies is provided integrally said separator,
wherein said separator further comprises other bridges connected to said sandwiching sections and said case unit, the other bridges having other reactant gas supply channels for supplying the oxygen-containing gas to said oxygen-containing gas inlet or supplying the fuel gas to said fuel gas inlet,
wherein said separator further comprises first and second plates, each of the first and second plates being integrally provided with the case unit, and
wherein said case unit further comprises other reactant gas supply units, and other reactant gas supply passages for supplying the oxygen-containing gas or the fuel gas to the other reactant gas supply channels extend through the other reactant gas supply units in the stacking direction, and wherein the other reactant gas supply passages are an enclosed flow passage that extends parallel to the stacking direction.

2. A fuel cell according to claim 1, wherein said case unit has a filling chamber being filled with the oxygen-containing gas or the fuel gas supplied from the other reactant gas supply passages.

3. A fuel cell according to claim 2, wherein said separator includes:
a first plate having said fuel gas inlet; and
a second plate having said oxygen-containing gas inlet, said reactant gas supply channel, the other reactant gas supply channel, and said filling chamber,
wherein said first plate and said second plate are stacked together.

4. A fuel cell according to claim 1, wherein said case unit has an annular shape.

5. A fuel cell according to claim 1, wherein said electrolyte electrode assemblies are provided at predetermined angular intervals around said reactant gas supply unit.

6. A fuel cell according to claim 5, wherein said electrolyte electrode assemblies are arranged along a circle concentric with said reactant gas supply unit.

7. A fuel cell according to claim 1, wherein the number of said bridges is the same as the number of said electrolyte electrode assemblies.

8. A fuel cell according to claim 1, wherein the number of said sandwiching sections is the same as the number of said electrolyte electrode assemblies.

9. A fuel cell according to claim 1, wherein the number of the other bridges is the same as the number of said electrolyte electrode assemblies.

10. A fuel cell according to claim 1, wherein the number of the other reactant gas supply passages is the same as the number of said electrolyte electrode assemblies.

11. A fuel cell according to claim 1, wherein said reactant gas supply passage, said bridge, and said sandwiching section are arranged in a straight line along a separator surface.

12. A fuel cell according to claim 1, wherein said reactant gas supply passage, said bridge, said sandwiching section, and the other bridge are arranged in a straight line along a separator surface.

13. A fuel cell according to claim 1, wherein said reactant gas supply passage, said bridge, said sandwiching section, the other bridge, and the other reactant gas supply passage are arranged in a straight line along a separator surface.

14. A fuel cell stack formed by stacking a plurality of fuel cells, said fuel cells each formed by stacking electrolyte electrode assemblies between separators, said electrolyte electrode assemblies each including an anode, a cathode, and an electrolyte interposed between said anode and said cathode, said separators each comprising:

sandwiching sections for sandwiching said electrolyte electrode assemblies, at least a reactant gas inlet for supplying a reactant gas that is a fuel gas or an oxygen-containing gas along an electrode surface of said anode or said cathode being formed in each of said sandwiching sections;

bridges connected to said sandwiching sections, and each having a reactant gas supply channel for supplying the reactant gas to said reactant gas inlet;

a reactant gas supply unit connected to said bridges, a reactant gas supply passage extending through said reactant gas supply unit in a stacking direction for supplying the reactant gas to said reactant gas supply channel; and a case unit forming an outer circumferential portion of said separator for containing said electrolyte electrode assemblies;

wherein said separator further comprises first and second plates, each of the first and second plates being integrally provided with the case unit;

wherein said separator further comprises other bridges connected to said sandwiching sections and said case unit, the other bridges having other reactant gas supply channels for supplying the oxygen-containing gas to said oxygen-containing gas inlet or supplying the fuel gas to said fuel gas inlet;

wherein said case unit further comprises other reactant gas supply units, and other reactant gas supply passages for supplying the oxygen-containing gas or the fuel gas to the other reactant gas supply channels extend through the other reactant gas supply units in the stacking direction, and wherein the other reactant gas supply passages are an enclosed flow passage that extends parallel to the stacking direction;

at least one extension for collecting the voltage obtained in power generation of said electrolyte electrode assemblies is formed in the outer circumferential portion of said case unit; and a voltmeter is connected to said extension on one of said separators and said extension on another of said separators.

15. A fuel cell stack formed by stacking a plurality of fuel cells, said fuel cells each formed by stacking electrolyte electrode assemblies between separators, said electrolyte electrode assemblies each including an anode, a cathode, and an electrolyte interposed between said anode and said cathode, said separators each comprising:

sandwiching sections for sandwiching said electrolyte electrode assemblies, a fuel gas inlet for supplying a fuel gas along an electrode surface of said anode and an oxygen-containing gas inlet for supplying an oxygen-containing gas along an electrode surface of said cathode being formed in each of said sandwiching sections;

first bridges connected to said sandwiching sections, and each having a first reactant gas supply channel for supplying the fuel gas to said fuel gas inlet or supplying the oxygen-containing gas to said oxygen-containing gas inlet;

a first reactant gas supply unit connected to said first bridges, a first reactant gas supply passage extending through said first reactant gas supply unit in a stacking direction for supplying the fuel gas or the oxygen-containing gas to said first reactant gas supply channel;

second bridges connected to said sandwiching sections, and each having a second reactant gas supply channel for supplying the fuel gas to said fuel gas inlet or supplying the oxygen-containing gas to said oxygen-containing gas inlet;

a case unit connected to said second bridges, said case unit containing said electrolyte electrode assemblies; and second reactant gas supply units provided in said case unit, second reactant gas supply passages extending through said second reactant gas supply units in the stacking direction for supplying the oxygen-containing gas or the fuel gas to said second reactant gas channel and further extending through the second reactant gas supply units of another fuel cell in the stacking direction, and wherein the second reactant gas supply passages are an enclosed flow passage that extends parallel to the stacking direction, wherein said sandwiching sections, said first bridges, said first reactant gas supply unit, said second bridges, said case unit and said second reactant gas supply units are provided integrally with said separator;

wherein said separator further comprises first and second plates, each of the first and second plates being integrally provided with the case unit; and at least one extension for collecting the voltage obtained in power generation of said electrolyte electrode assemblies is formed in an outer circumferential portion of said case unit.

16. A fuel cell stack according to claim 14, wherein when said separators are stacked together, and said extensions of adjacent separators are in phase with each other.

17. A fuel cell stack according to claim 14, wherein when said separators are stacked together, said extensions of adjacent separators are out of phase with each other.

18. A fuel cell stack according to claim 14, wherein a plurality of said extensions are provided diagonally oppositely in an outer circumferential portion of said case unit.

19. A fuel cell stack according to claim 14, wherein a plurality of said extensions are provided at equal angular intervals in an outer circumferential portion of said case unit.

20. A fuel cell stack according to claim 14, further comprising a voltmeter connected to one of said extensions provided in one of said separators and one of said extensions provided in another of said separators,
wherein another extension is used for positioning said separators.

21. A fuel cell stack according to claim 15, wherein when said separators are stacked together, and said extensions of adjacent separators are in phase with each other.

22. A fuel cell stack according to claim 15, wherein when said separators are stacked together, said extensions of adjacent separators are out of phase with each other.

23. A fuel cell stack according to claim 15, further comprising a voltmeter connected to said extension on one of said separators and said extension on another of said separators.

24. A fuel cell stack according to claim 15, wherein a plurality of said extensions are provided diagonally oppositely in an outer circumferential portion of said case unit.

25. A fuel cell stack according to claim 15, wherein a plurality of said extensions are provided at equal angular intervals in an outer circumferential portion of said case unit.

26. A fuel cell stack according to claim 15, further comprising a voltmeter connected to one of said extensions provided in one of said separators and one of said extensions provided in another of said separators,
wherein another extension is used for positioning said separators.

* * * * *